US009094086B2

(12) United States Patent
Takahashi et al.

(10) Patent No.: US 9,094,086 B2
(45) Date of Patent: *Jul. 28, 2015

(54) IMAGING DEVICE AND WIRELESS SYSTEM
(71) Applicant: OLYMPUS CORPORATION, Tokyo (JP)
(72) Inventors: Tetsuyuki Takahashi, Tokyo (JP); Kiyoshi Toyoda, Tokyo (JP)
(73) Assignee: OLYMPUS CORPORATION, Tokyo (JP)
( * ) Notice: Subject to any disclaimer, the term of this patent is extended or adjusted under 35 U.S.C. 154(b) by 0 days.

This patent is subject to a terminal disclaimer.

(21) Appl. No.: 14/096,677
(22) Filed: Dec. 4, 2013
(65) Prior Publication Data
US 2014/0085526 A1     Mar. 27, 2014

Related U.S. Application Data
(63) Continuation of application No. PCT/JP2012/065035, filed on Jun. 12, 2012.

(30) Foreign Application Priority Data

Jun. 24, 2011   (JP) .................................. 2011-141193

(51) Int. Cl.
*H04B 1/16* (2006.01)
*H04N 1/32* (2006.01)
(Continued)
(52) U.S. Cl.
CPC .. *H04B 1/16* (2013.01); *H01Q 3/24* (2013.01); *H01Q 3/26* (2013.01); *H01Q 21/061* (2013.01);
(Continued)

(58) Field of Classification Search
CPC ..... H04N 5/22; H04N 5/232; H04N 5/23293; H04N 2201/3205; H04N 7/173; H04N 1/32122; H04N 1/00326; H04B 7/18; H04B 7/14; H04B 15/00; H04B 1/04; H04B 1/16; H04B 1/32122; H04M 1/00; G06K 7/10; H01Q 3/26; H01Q 21/061; H01Q 3/24
USPC .................. 348/333.02, 211.99, 211.2, 211.4, 348/211.8, 207.99, 211.3; 455/13.3, 25, 19, 455/63.4, 121, 526.1, 575.7; 725/105; 235/462.46, 472.02; 705/40–44; 709/203, 218
See application file for complete search history.

(56) References Cited

U.S. PATENT DOCUMENTS 6,628,899 B1 *  9/2003  Kito ................................ 396/56
7,324,471 B2    1/2008  Kim
(Continued)

FOREIGN PATENT DOCUMENTS

JP    2002-218503 A    8/2002
JP        3441422 B2    9/2003
(Continued)

OTHER PUBLICATIONS

International Search Report of PCT/JP2012/065035, mailing date of Jul. 17, 2012.
(Continued)

*Primary Examiner* — Tuan Ho
*Assistant Examiner* — Marly Camargo
(74) *Attorney, Agent, or Firm* — Westerman, Hattori, Daniels & Adrian, LLP

(57) ABSTRACT

An imaging device includes: an imaging unit that captures images; a display unit that displays the images; an antenna arranged at a predetermined position relative to the imaging unit; an antenna control unit that changes the direction of maximum gain for the antenna and controls the directionality of the antenna; a wireless unit that, via the antenna, transmits search data to at least one wireless terminal and receives response data in relation to the search data; a signal strength detection unit that detects the reception strength of the response data; an identification information extraction unit that identifies identification information for the wireless terminal that is the transmission source for the response data; a record control unit that generates data sets associating the identification information, the reception strength, and the direction of maximum gain.

11 Claims, 14 Drawing Sheets

(51) Int. Cl.
*H04N 1/00* (2006.01)
*H01Q 3/26* (2006.01)
*H04N 5/232* (2006.01)
*H01Q 21/06* (2006.01)
*H01Q 3/24* (2006.01)
*H04N 101/00* (2006.01)

(52) U.S. Cl.
CPC ....... *H04N 1/00326* (2013.01); *H04N 1/32122* (2013.01); *H04N 5/23293* (2013.01); *H04N 2101/00* (2013.01); *H04N 2201/0084* (2013.01); *H04N 2201/3205* (2013.01); *H04N 2201/3245* (2013.01); *H04N 2201/3273* (2013.01); *H04N 2201/3278* (2013.01)

(56) References Cited

U.S. PATENT DOCUMENTS

| | | | | |
|---|---|---|---|---|
| 8,482,634 | B2* | 7/2013 | Kusaka et al. | 348/231.5 |
| 2003/0134648 | A1 | 7/2003 | Reed et al. | |
| 2005/0001024 | A1* | 1/2005 | Kusaka et al. | 235/375 |
| 2005/0041148 | A1 | 2/2005 | Bae | |
| 2005/0270407 | A1 | 12/2005 | Yamaguchi | |
| 2006/0020996 | A1* | 1/2006 | Takagi et al. | 725/124 |
| 2006/0056832 | A1* | 3/2006 | Yamaguchi et al. | 396/56 |
| 2008/0166966 | A1* | 7/2008 | Hamasaki et al. | 455/41.2 |
| 2009/0325607 | A1 | 12/2009 | Conway et al. | |
| 2010/0081491 | A1* | 4/2010 | Lee | 455/575.7 |
| 2010/0097483 | A1 | 4/2010 | Icho et al. | |
| 2010/0141778 | A1 | 6/2010 | Basson et al. | |
| 2011/0076939 | A1 | 3/2011 | Sato | |
| 2011/0273575 | A1* | 11/2011 | Lee | 348/222.1 |
| 2014/0104443 | A1* | 4/2014 | Takahashi et al. | 348/207.1 |

FOREIGN PATENT DOCUMENTS

| | | |
|---|---|---|
| JP | 2004-297422 A | 10/2004 |
| JP | 2006-025182 A | 1/2006 |
| JP | 2006-174010 A | 6/2006 |
| JP | 2008-160879 A | 7/2008 |
| JP | 2008-305043 A | 12/2008 |
| JP | 2009-094890 A | 4/2009 |
| JP | 2009-164803 A | 7/2009 |
| JP | 2010-114798 A | 5/2010 |
| JP | 4479386 B2 | 6/2010 |
| WO | 2005/043270 A2 | 5/2005 |
| WO | 2008/061810 A1 | 5/2008 |
| WO | 2009/068089 A1 | 6/2009 |

OTHER PUBLICATIONS

International Search Report, dated Jul. 10, 2012, issued in related application No. PCT/JP2012/064750 (4 pages).
Notice of Allowance dated Dec. 5, 2014, issued in co-pending U.S. Appl. No. 14/105,924 (8 pages).
Extended European Search Report dated Feb. 16, 2015, issued in European Patent Application No. 12802333.0 (6 pages).

* cited by examiner

FIG. 5

| OUTGOING ANGLE (°) | IDENTIFICATION INFORMATION | RECEPTION INTENSITY(dB) | |
|---|---|---|---|
| 90 | NONE | −100 | ~5g |
| ⋮ | ⋮ | ⋮ | |
| 62 | ID3 | −25 | ~5a |
| 61 | ID3 | −15 | ~5b |
| 60 | ID3 | −40 | ~5c |
| 59 | NONE | −100 | |
| ⋮ | ⋮ | ⋮ | |
| 0 | NONE | −100 | |
| ⋮ | ⋮ | ⋮ | |
| −72 | ID2 | −51 | ~5d |
| −73 | ID2 | −40 | ~5e |
| −74 | ID2 | −50 | ~5f |
| −75 | NONE | −100 | |
| ⋮ | ⋮ | ⋮ | |
| −90 | NONE | 100 | |

FIG. 9

| RELATIVE ANGLE $\theta_1$(°) | SIGNAL INTENSITY $P_R$(dB) | DISTANCE X (PIXEL) FROM CENTER ON DISPLAY PANEL | |
|---|---|---|---|
| 0 | −90 | 512 | ～9a |
| 0 | −80 | 450 | ～9b |
| ⋮ | ⋮ | ⋮ | |
| 15 | −90 | 500 | ～9c |
| 15 | −80 | 435 | ～9d |
| ⋮ | ⋮ | ⋮ | |
| 30 | −90 | 480 | |
| 30 | −80 | 410 | |
| ⋮ | ⋮ | ⋮ | |

FIG. 10

| SIGNAL INTENSITY $P_R$(dB) | DISTANCE X (mm) | |
|---|---|---|
| −90 | 300 | ～10a |
| −80 | 450 | ～10b |
| ⋮ | ⋮ | |

PRIOR ART

IMAGING DEVICE AND WIRELESS SYSTEM

CROSS REFERENCE TO RELATED APPLICATIONS

This application is a continuation application based on a PCT Patent Application No. PCT/JP2012/065035, filed Jun. 12, 2012, whose priority is claimed on Japanese Patent Application No. 2011-141193 filed Jun. 24, 2011, the entire content of which are hereby incorporated by reference.

BACKGROUND OF THE INVENTION

1. Field of the Invention

The present invention relates to an imaging device and a wireless system.

2. Description of the Related Art

As a photographing device that includes an array antenna and that receives radio waves transmitted by a transmission device which a subject has through the array antenna and displays an arrival direction of the radio waves on a finder included in the photographing device, there is a photographing device disclosed in, for example, Japanese Patent (Granted) Publication No. 4479386.

However, when a distance between the transmission device (called a wireless terminal in the present application) which the subject has and the photographing device (called an imaging device in the present application) is short, the position of the transmission device is not able to be detected accurately in some cases. Such a case will be described below with reference to the drawing.

As illustrated in FIG. 17, a distance between an imaging device 17-1 and a wireless terminal 17-5 is sufficiently greater than a distance between an image capturing element 17-3 and an array antenna 17-4. Therefore, there is no problem with a difference between the positions of the centers of the image capturing element 17-3 and the array antenna 17-4 and a direction of the wireless terminal 17-5 viewed from the image capturing element 17-3 substantially coincides with a direction of the wireless terminal 17-5 viewed from the array antenna 17-4. However, a wireless terminal 17-6 is located at a position closer to the imaging device 17-1 than the wireless terminal 17-5. In this case, a direction of the wireless terminal 17-6 viewed from the image capturing element 17-3 is considerably different from a direction of the wireless terminal 17-6 viewed from the array antenna 17-4. When identification information of the wireless terminal 17-6 is displayed at a position calculated based on the direction of a signal which the array antenna 17-4 receives from the wireless terminal 17-6, the identification information of the wireless terminal 17-6 may be displayed at a position different from a display position of the wireless terminal 17-6 imaged by the imaging device 17-1.

More specifically, the wireless terminal 17-5 is located far away. Therefore, the wireless terminal 17-5 is located on the left side not only when viewed from the image capturing element 17-3 but also when viewed from the array antenna 17-4. Accordingly, the position of the wireless terminal 17-1 displayed on a display unit 17-2 is substantially the same as its identification information. On the other hand, the wireless terminal 17-6 located at a closer position than the wireless terminal 17-5 is located on the right side when viewed from the image capturing element 17-3, and is located on the left side when viewed from the array antenna 17-4. In this case, when the imaging device 17-1 superimposes an ID (identification information) on a position detected by the array antenna 17-4 by augmented reality (AR), as illustrated in FIG. 17, both of identification information ID: A of the wireless terminal 17-5 and identification information ID: B of the wireless terminal 17-6 may be displayed on the left side, unlike a captured image. That is, there is a problem that a position may be deviated in an image of the wireless terminal 17-6, when additional information such as an icon of the wireless terminal is displayed.

SUMMARY

According to a first aspect of the present invention, an imaging device includes: an image capturing unit that captures an image; a display unit that displays the image; an antenna that is disposed at a position determined in advance with respect to the image capturing unit; an antenna control unit that controls directivity of the antenna by changing a maximum gain direction of the antenna; a wireless unit that transmits searching data to one or more wireless terminals through the antenna and receives response data corresponding to the searching data; a signal intensity detection unit that detects a reception intensity of the response data; an identification information extraction unit that specifies identification information of the wireless terminal which is a transmission source of the response data; a recording control unit that generates data sets in which the identification information, the reception intensity, and the maximum gain direction are associated with each other; a recording unit that records the data sets; a relative angle extraction unit that extracts the maximum gain direction of the data set having the reception intensity relatively greater than the other reception intensities among the data sets with the same identification information recorded in the recording unit, as a relative angle indicating a relative direction of the wireless terminal relative to the imaging device serving as a reference; an estimated position calculation unit that calculates an estimated position of the wireless terminal on the display unit based on an angle of view of the display unit, the relative angle, a positional relation between the image capturing unit and the antenna, and the reception intensity; and a display control unit that performs control such that the display unit displays the image and that superimposes and displays terminal information used to specify the wireless terminal corresponding to the identification information on the estimated position.

According to a second aspect of the present invention, in the imaging device according to the first aspect, the estimated position calculation unit may calculate a distance between the imaging device and the wireless terminal based on the reception intensity and calculate the estimated position based on the angle of view, the relative angle, the positional relation between the image capturing unit and the antenna, and the distance.

According to a third aspect of the present invention, in the imaging device according to the first aspect, the recording unit may include a conversion table generated in advance, and the estimated position calculation unit may perform part of the calculation of the estimated position using a value read from the conversion table.

According to a fourth aspect of the present invention, in the imaging device according to the first aspect, the recording unit may include a conversion table in which the estimated position calculated in advance based on the angle of view, the relative angle, the positional relation between the image capturing unit and the antenna, and the reception intensity may correspond to the reception intensity and the relative angle, and the estimated position calculation unit may calculate the estimated position based on the relative angle, the reception intensity, and the conversion table.

According to a fifth aspect of the present invention, in the imaging device according to any one of the first to fourth aspect, the antenna may be an array antenna including a plurality of antenna elements and the antenna control unit controls the directivity by changing phases of signals applied to the antenna elements.

According to a sixth aspect of the present invention, the imaging device according to the first aspect may further include: an instruction input detection unit that detects an instruction of an operator to perform wireless connection between the plurality of wireless terminals by detecting an instruction of the operator to select the terminal information displayed on the display unit; and a wireless connection conversion control unit that performs control of transmission of control data regarding the wireless connection to at least one of the wireless terminals based on the instruction of the operator detected by the instruction input detection unit, wherein the wireless unit may transmit the control data.

According to a seventh aspect of the present invention, a wireless system includes: the imaging device according to the sixth aspect; and the plurality of wireless terminals that switch connection between the wireless terminals based on the control data received from the imaging device.

According to an eighth aspect of the present invention, in the wireless system according to the seventh aspect, the wireless terminal may perform wireless connection with the other wireless terminals and wireless connection with the imaging device using the same antenna and the same wireless unit.

BRIEF DESCRIPTION OF THE DRAWINGS

FIG. 5 is a diagram illustrating an example of a table of data sets in accordance with the first preferred embodiment.

FIG. 9 is a schematic diagram illustrating an example of a table in accordance with the second preferred embodiment.

FIG. 10 is a schematic diagram illustrating another example of the table in accordance with the second preferred embodiment.

DESCRIPTION OF THE PREFERRED EMBODIMENTS

First Preferred Embodiment

Hereinafter, a preferred embodiment of the present invention will be described in detail with reference to the drawings.

Figure 1:
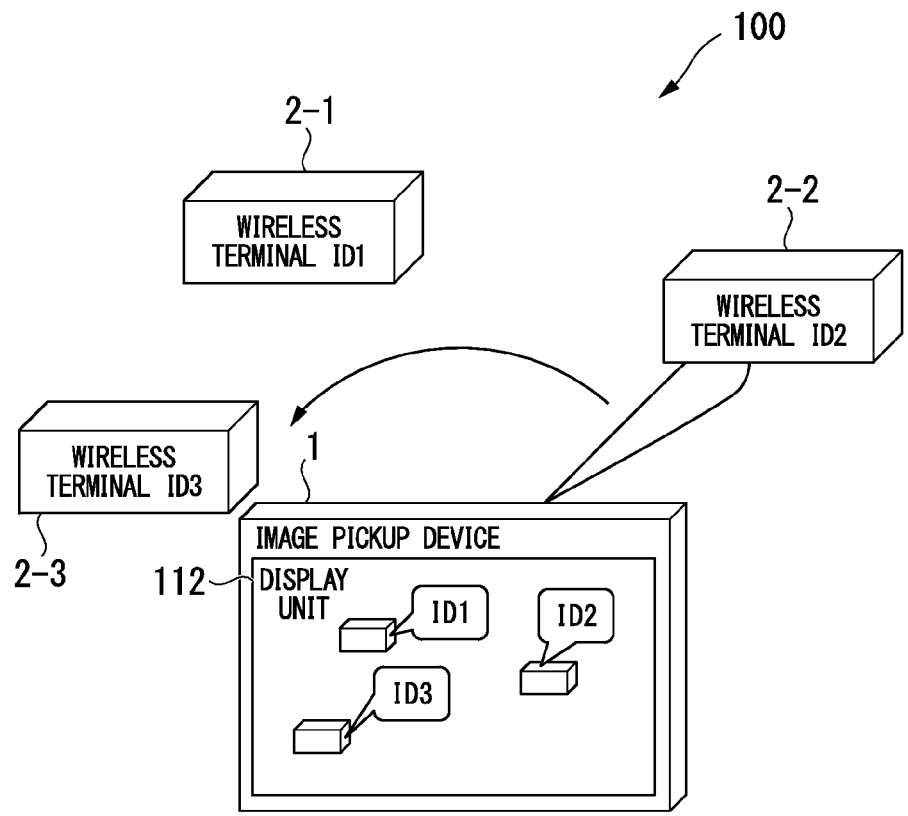
FIG. 1 is a schematic diagram illustrating a wireless system in accordance with a first preferred embodiment of the present invention.

FIG. 1 is a schematic diagram illustrating a wireless system in accordance with the first preferred embodiment. In the illustrated example, a wireless system 100 includes an imaging device 1 and three wireless terminals 2-1, 2-2, and 2-3. Unique IDs (ID1 to ID3) used to identify the wireless terminals are assigned to the wireless terminals 2-1 to 2-3. A display unit 112 included in the imaging device 1 displays images captured by the imaging device 1 and indicating dispositions of the wireless terminals 2-1 to 2-3 in the real space. The display unit 112 of the imaging device 1 additionally displays identification information (additional information) regarding one or a combination of the unique ID, a simple ID, a name, a format, and the like of each wireless device in the vicinity of the images of the captured wireless terminals 2-1 to 2-3 in correspondence with the images. In FIG. 1, ID1 to ID3 are displayed as the identification information in correspondence with the wireless terminals 2-1 to 2-3.

Figure 2:
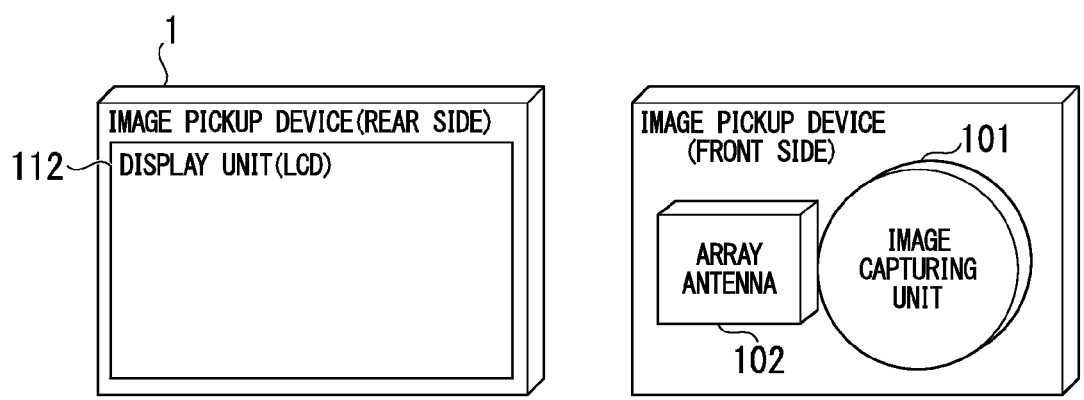
FIG. 2 is a diagram illustrating an outer appearance of an imaging device in accordance with the first preferred embodiment.

FIG. 2 is a diagram illustrating the outer appearance of the imaging device in accordance with the present invention. In the illustrated example, the imaging device 1 includes an image capturing unit 101, an array antenna 102, and the display unit 112. The image capturing unit 101 and the array antenna 102 are disposed on the front side of the imaging device 1. The display unit 112 is disposed on the rear side of the imaging device 1.

The image capturing unit 101 includes a lens (not illustrated) that condenses light and an image capturing element such as a CCD or a CMOS sensor (not illustrated) that converts a subject image formed by the lens into an electric signal. The array antenna 102 (antenna) includes a plurality of antenna elements (not illustrated) arranged in a 2-dimensional direction. The display unit 112 is a display device configured by an LCD, an organic EL, or the like.

Figure 3:
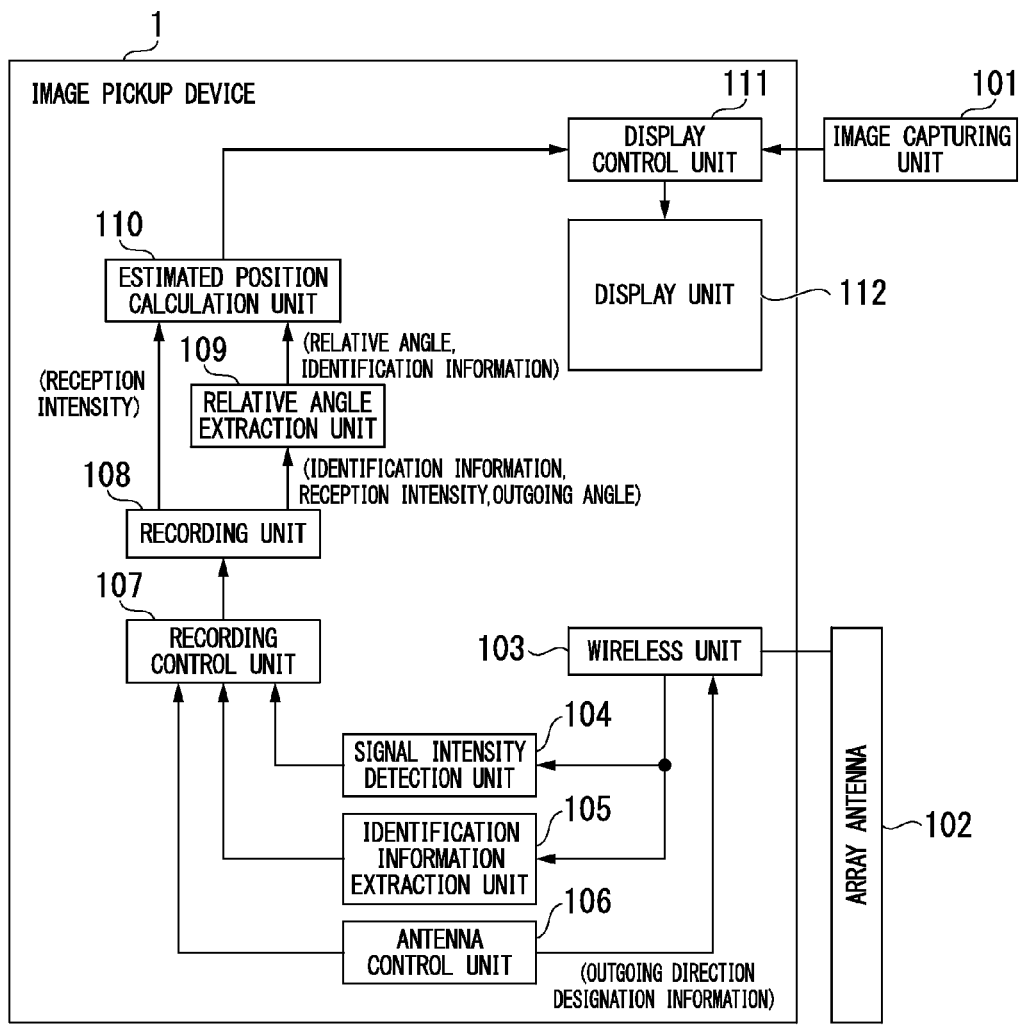
FIG. 3 is a block diagram illustrating the constitution of the imaging device in accordance with the first preferred embodiment.

FIG. 3 is a block diagram illustrating the constitution of the imaging device 1. In the illustrated example, the imaging device 1 includes the image capturing unit 101, the array antenna 102, a wireless unit 103, a signal intensity detection unit 104, an identification information extraction unit 105, an antenna control unit 106, a recording control unit 107, a recording unit 108, a relative angle extraction unit 109, an estimated position calculation unit 110, a display control unit 111, and the display unit 112.

The image capturing unit 101 outputs video information indicating a video captured by the image capturing element to the display control unit 111. The array antenna 102 (antenna) can transmit and receive radio waves having directivity at an outgoing angle (maximum gain direction) of the radio waves output from the antenna by controlling the phases of signals output to the plurality of antenna elements (not illustrated). The array antenna 102 can change outgoing angles of the radio waves by changing the phases of the signals output to the plurality of antenna elements. In this specification, an outgoing angle of the array antenna 102 is defined as follows. That is, with regard to the horizontal direction and the vertical direction, a direction perpendicular to an outgoing surface of the array antenna 102 is defined to be 0° and directions parallel to the array antenna 102 are defined to be +90° (for example, the left side) and −90° (for example, the right side). A radio frequency (RF) signal is input from the wireless unit 103 to the array antenna 102. The antenna control unit 106 outputs outgoing direction designation information used to designate the outgoing direction of the antenna to the wireless unit 103. The wireless unit 103 converts the outgoing direction designation information into a displacement amount of phases of the signals output to the plurality of antenna elements (not illustrated) and outputs the displacement amount of phases of the signals to the array antenna 102. The array antenna 102 transmits the radio waves in the outgoing direction. The array antenna 102 outputs the received RF signal to the wireless unit 103.

The wireless unit 103 generates a searching packet (searching data) used to search for a wireless terminal and converts the generated searching packet into an RF signal.

When each of the wireless terminals 2-1, 2-2, and 2-3 illustrated in FIG. 1 receives the searching packet, each wireless terminal generates, modulates, and transmits a response packet (response data) indicating that data communication is possible. The imaging device 1 receives the modulated response packet through the array antenna 102 and demodulates the response packet through the wireless unit 103.

The RF signal obtained by synthesizing inputs from the plurality of antenna elements of the array antenna 102 before the demodulation is input from the wireless unit 103 to the signal intensity detection unit 104. The signal intensity detection unit 104 detects the signal intensity (reception intensity) of the input RF signal. The signal intensity detection unit 104 outputs signal intensity information indicating the signal intensity to the recording control unit 107 when signal intensity output information indicating that the signal intensity output from the recording control unit 107 is input. The demodulated response packet is input from the wireless unit 103 to the identification information extraction unit 105. The response packet includes identification information regarding the wireless terminal transmitting the response packet. The identification information extraction unit 105 extracts the identification information included in the response packet. The identification information extraction unit 105 outputs the identification information to the recording control unit 107 when identification information output information indicating that the identification information is output from the recording control unit 107 is input.

The antenna control unit 106 performs control (control of the maximum gain direction, that is, the outgoing angle) of the directivity of the array antenna 102 by changing the phase of the signal applied to each antenna element of the array antenna 102. The antenna control unit 106 outputs outgoing direction designation information used to designate the outgoing direction of the array antenna 102 to the wireless unit 103. The antenna control unit 106 performs control to change the outgoing angle of the array antenna 102 into a 2-dimensional direction. The antenna control unit 106 performs control to change the outgoing angle of the array antenna 102 so that all of the regions (searching region) of a viewing angle at which the image capturing unit 101 performs image capturing are covered. When the change of the outgoing angle in all of the directions within the searching region is ended, the antenna control unit 106 outputs searching end information indicating that change of the outgoing angle in all of the directions within the searching region is ended to the recording control unit 107. When outgoing angle output information indicating output of the array antenna 102 at an outgoing angle is input from the recording control unit 107, the antenna control unit 106 outputs outgoing direction information indicating an outgoing direction to the recording control unit 107.

When information to be recorded on the recording unit 108 is input, the recording control unit 107 records the input information on the recording unit 108. The recording control unit 107 outputs the signal intensity output information to the signal intensity detection unit 104. The signal intensity information is input from the signal intensity detection unit 104 to the recording control unit 107 according to the signal intensity output information. The recording control unit 107 outputs the identification information output information to the identification information extraction unit 105. The identification information is input from the identification information extraction unit 105 to the recording control unit 107 according to the identification information output information. The recording control unit 107 outputs the outgoing angle output information to the antenna control unit 106. The outgoing direction information is input from the antenna control unit 106 to the recording control unit 107 according to the outgoing angle information. The recording control unit 107 writes the signal intensity information, the identification information, and the outgoing direction information on the recording unit 108. When the searching end information is input from the antenna control unit 106, the recording control unit 107 outputs the searching end information to the relative angle extraction unit 109 via the recording unit 108.

The recording unit 108 includes a volatile memory, a non-volatile memory, or a hard disk. The volatile memory, the non-volatile memory, or the hard disk can be selected according to a device shape, a use method, an environment, or the like. The recording unit 108 stores a measurement table having data sets in which the signal intensity information, the identification information, and the outgoing angle information are associated with each other. The signal intensity information, the identification information, and the outgoing angle information recorded on the recording unit 108 are read from the relative angle extraction unit 109. The recording unit 108 outputs the searching end information input from the recording control unit 107 to the relative angle extraction unit 109. The details of the format of the measurement table recorded on the recording unit 108 will be described below with reference to the drawing.

The relative angle extraction unit 109 extracts a relative angle when the searching end information is input from the recording unit 108. The relative angle extraction unit 109 selects the data sets having the same identification information from the measurement table recorded on the recording unit 108. The relative angle extraction unit 109 extracts the outgoing angle of the data set having the maximum signal intensity among the selected data sets and extracts this outgoing angle as the relative angle of the wireless terminal having the identification information. The relative angle extraction unit 109 outputs the identification information and the relative angle information indicating the extracted relative angle to the estimated position calculation unit 110. The extraction of the relative angle performed by the relative angle extraction unit 109 will be described below in detail with reference to the drawing.

The estimated position calculation unit 110 calculates a display position (estimated position) of the identification information of the wireless terminal displayed on the display unit 112 based on the relative angle input from the relative angle extraction unit 109, an angle of view of the image capturing unit 101, the number of pixels of the display unit 112, and the like. The estimated position calculation unit 110 outputs display position information indicating the calculated display position of the identification information of the wireless terminal to the display control unit 111 by stringing the display position information with the identification information. The calculation of the display position of the identification information of the wireless terminal performed by the estimated position calculation unit 110 will be described below in detail with reference to the drawing.

Video information indicating the outer appearance of each wireless terminal captured by the image capturing unit 101 is input to the display control unit 111. The display control unit 111 generates an identification image of the identification information itself input from the estimated position calculation unit 110 or an identification image figured or abstracted so that an operator can easily comprehend the identification information. The display control unit 111 generates display information in which the generated identification image is superimposed on a video indicated by the video information at the display position indicated by the display position information input from the estimated position calculation unit 110. The display control unit 111 outputs the generated display information to the display unit 112. When the display information is input from the display control unit 111, the display unit 112 displays the video indicated by the display information on a display surface.

Figure 4:
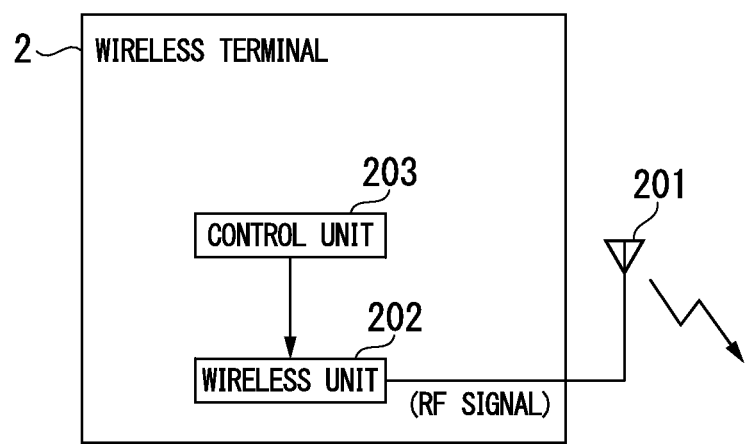
FIG. 4 is a block diagram illustrating the constitution of a wireless terminal in accordance with the first preferred embodiment.

FIG. 4 is a block diagram illustrating the constitution of the wireless terminal 2 in accordance with the first preferred embodiment. In the illustrated example, the wireless terminal 2 includes an antenna 201, a wireless unit 202, and a control unit 203. The antenna 201 is used for communication with the imaging device 1. The antenna 201 transmits an RF signal input from the wireless unit 202 as radio waves oriented toward the imaging device 1. The antenna 201 receives the radio waves transmitted from the imaging device 1. The antenna 201 outputs the RF signal corresponding to the received radio waves to the wireless unit 202. When the RF signal is input from the antenna 201, the wireless unit 202 converts the input RF signal into a baseband signal and outputs the converted baseband signal to the control unit 203. The wireless unit 202 converts the baseband signal input from the control unit 203 into an RF signal. The wireless unit 202 outputs the converted RF signal to the antenna 201. When the searching packet is input from the wireless unit 202, the control unit 203 outputs a response packet to which the ID information of the wireless terminal 2 is added to the wireless unit 202.

FIG. 5 is a schematic diagram illustrating an example of the measurement table recorded on the recording unit 108. As illustrated in the drawing, the measurement table has columns of items of the outgoing direction information, the identification information, and the reception intensity information. The measurement table is data with a 2-dimensional table format which has rows and columns in which the identification information and the reception intensity are stored for each outgoing angle. A data set 5a indicates that the outgoing angle is 62°, the identification information is ID3, and the reception intensity is −25 dB. A data set 5b indicates that the outgoing angle is 61°, the identification information is ID3, and the reception intensity is −15 dB. A data set 5c indicates that the outgoing angle is 60°, the identification information is ID3, and the reception intensity is −40 dB. The relative angle extraction unit 109 compares the reception intensities of the data sets 5a to 5c with the same identification information to each other and selects the data set 5b with the maximum reception intensity. Based on the outgoing angle of the selected data set 5b, the relative angle extraction unit 109 determines that the relative angle of the wireless terminal 2-3 having ID3 is 61° on the left side of the antenna.

A data set 5d indicates that the outgoing angle is −72°, the identification information is ID2, and the reception intensity is −51 dB. A data set 5e indicates that the outgoing angle is −73°, the identification information is ID2, and the reception intensity identification information is −40 dB. A data set 5f indicates that the outgoing angle is −74°, the identification information is ID2, and the reception intensity is −50 dB. The relative angle extraction unit 109 compares the reception intensities of the data sets 5d to 5f to each other and selects the data set 5e indicating the maximum reception intensity. Based on the outgoing angle of the selected data set 5e, the relative angle extraction unit 109 determines that the relative angle of the wireless terminal 2-3 having ID3 is 73° on the right side of the antenna. A data set 5g indicates that the outgoing angle is 90°, the identification information is not present, and the reception intensity is −100 dB. The data set 5g indicates that the reception intensity of the RF signal received in the direction of the outgoing angle of 90° by the array antenna 102 is weaker than a reception limit intensity (here, −100 dB) which is the intensity of the detectable minimum RF signal and thus the identification information is not specifiable.

Figure 6:
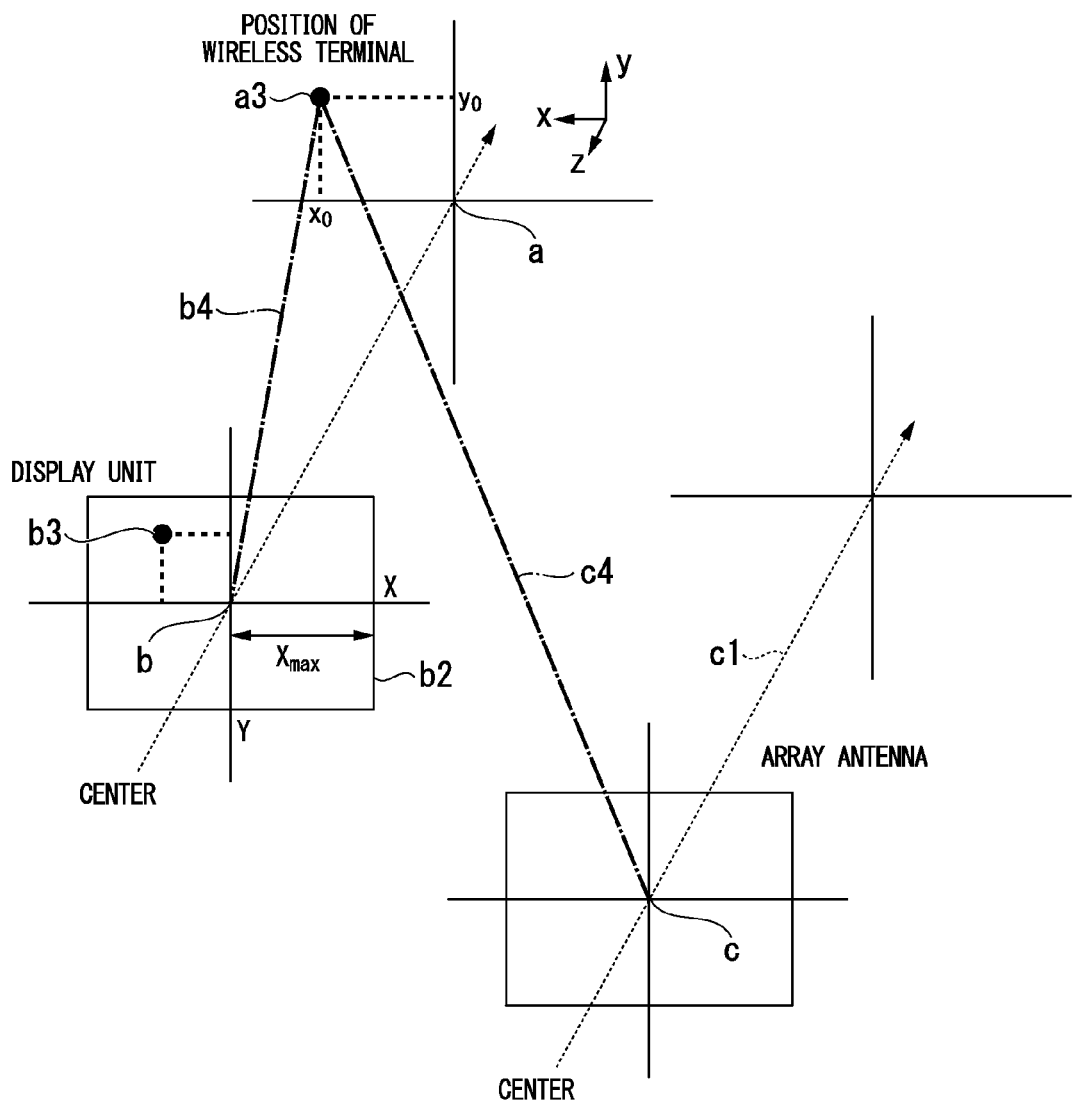
FIG. 6 is a schematic diagram illustrating a positional relation between the imaging device and the wireless terminal and a relation between display positions displayed on a display unit in accordance with the first preferred embodiment.

FIG. 6 is a schematic diagram illustrating a positional relation among the image capturing unit 101 of the imaging device 1, the array antenna 102, and the wireless terminal 2 in a 3-dimensional space. FIG. 6 illustrates a relation between the image of the wireless terminal 2 and the display position of the additional information displayed on the display unit 112. A point a indicates the origin of the coordinate system xyz in the real space. A point b indicates the central position of the image capturing unit 101 in the real space. The center of the display surface is also drawn at the same position as the center of the image capturing unit 101 for convenience. A point c indicates the central position of the array antenna 102 in the real space. A dashed line b1 indicates a central axis of the viewing angle of the image capturing unit 101 and indicates the central axis of the angle of view of the display unit 112 overlapping the central axis of the viewing angle. The origin a is formed on the dashed line b1. A dashed line c1 indicates a central axis of the array antenna 102 which is a direction when the outgoing angle of the array antenna 102 is 0°. A line b2 indicates the size of a display surface on the display unit 112. On the display surface, the coordinate system XY is defined and the origin is b, as illustrated. The half of the width of the display surface in the horizontal direction (X-axis direction) is defined to be $X_{max}$. A point a3 indicates the position of the wireless terminal 2 in the real space. In the illustrated example, the wireless terminal 2 is located at the coordinates $(x_0, y_0, 0)$ in the xyz coordinate system in the real space. A point b3 indicates the display position of the wireless terminal 2 displayed on the display surface of the display unit 112. A one-dot chain line b4 indicates the direction of the wireless terminal 2 viewed from the center of the image capturing unit 101. A one-dot chain line c4 indicates the direction of the wireless terminal 2 viewed from the center of the array antenna 102.

Since both of the points b and c are disposed on the surface of the imaging device 1, the points b and c have the same z coordinate in the xyz coordinate system in the real space. Since calculations of an estimated position in the horizontal (X) direction and an elevation angle (Y) direction are independent from each other and can be considered in the same way, the description will be made below with regard to only the horizontal (X) direction and the description with regard to the elevation angle (Y) direction will be omitted below.

Figure 7:
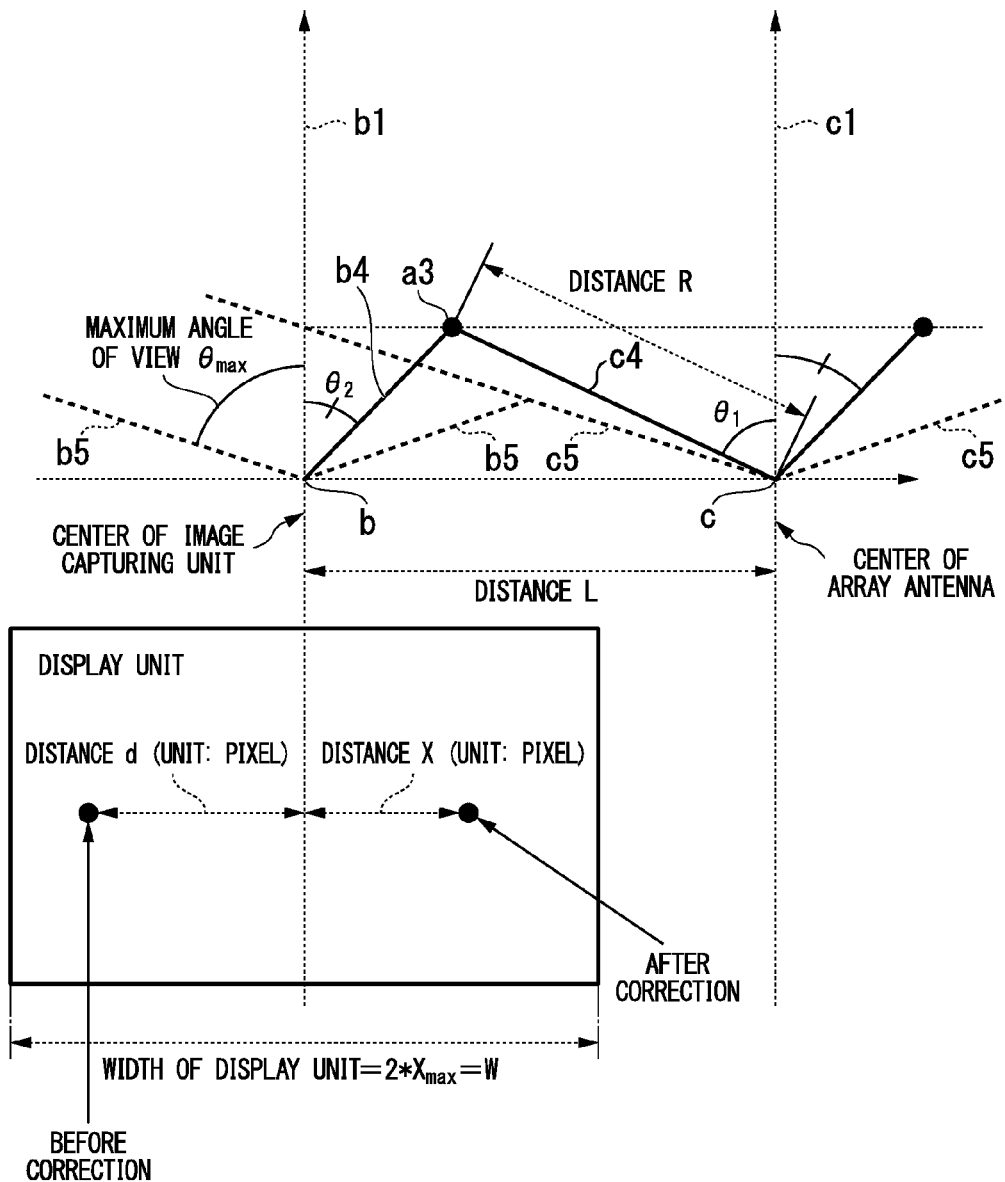
FIG. 7 is a diagram illustrating a mechanism of estimating the position of the wireless terminal displayed on the display unit in accordance with the first preferred embodiment.

FIG. 7 is a diagram for describing the calculation of estimating a display position of the additional information of the wireless terminal 2 displayed on the display unit 112 only in the horizontal (X) direction. $\theta_1$ indicates an angle (relative angle) formed by c1 and c4. $\theta_2$ indicates an angle formed by b1 and b4. A dashed line b5 indicates a viewing angle of the image capturing unit 101. A dashed line c5 indicates a spread angle in the outgoing direction of the array antenna 102 and indicates the same spread angle as the viewing angle of the image capturing unit 101. A distance d refers to a distance that is displayed on the display unit 112 and a distance up to the display position of the additional information before correction calculated based on $\theta_1$ and a distance R between a3 and c. A distance X refers to a distance up to the display position of the additional information after the correction displayed on the display unit 112.

(Measurement of Distance R)

The relative angle information and the identification information are input from the relative angle extraction unit 109 to the estimated position calculation unit 110. The estimated position calculation unit 110 reads the signal intensity information corresponding to the relative angle information and the identification information from the measurement table stored in the storage unit 108. The estimated position calculation unit 110 calculates the distance R based on the read signal intensity information. The distance R can be calculated using Equation (1).

$$P_R = P_T * \text{loss} * \frac{\lambda^2}{(4\pi R^2)} \qquad (1)$$

Here, $P_R$ indicates the signal intensity information read from the storage unit 108, $P_T$ indicates a signal intensity of a response packet transmitted by the wireless terminal 2, loss indicates a loss of the signal intensity due to an antenna or the like, and $\lambda$ indicates the wavelength of a transmitted and received signal. PT and $\lambda$ are integers determined at the time of design. Further, loss can be treated as an integer when loss is actually measured once when the imaging device 1 is completed in practice. Thus, an integer k expressed in Equation (2) is defined and is stored in advance in a non-volatile memory in the measured position calculation unit 110.

$$k = \frac{\lambda^2 * P_T * \text{loss}}{(4\pi)^2} \qquad (2)$$

When Equation (2) is substituted into Equation (1) and is solved for R, Equation (3) can be obtained.

$$R = \sqrt{\frac{k}{P_R}} \qquad (3)$$

The estimated position calculation unit 110 calculates the distance R by substituting the signal intensity into Equation (3).

(Calculation of Estimated Position)

Calculation of an estimated position which is a position at which the identification information is displayed on the display unit 112 will be described. The center of the image capturing unit 101 and the center of the array antenna 102 are distant from each other by a distance L. The number of pixels in the horizontal direction of the display unit 112 is assumed to be W pixels. Further, the center of the angle of view of the display unit 112 is assumed to coincide with the center of the viewing angle of the image capturing unit 101 and the angle of view and the viewing angle are bilaterally symmetric with the centers. The array antenna 102 transmits a searching packet and represents, as d pixels, a distance between the center of the display unit 112 and a position at which the additional information is to be displayed, the distance being calculated based on the direction (the outgoing direction $\theta_1$) of the antenna receiving a response packet transmitted in response to the searching packet, $\theta_{max}$ which is the half of the maximum angle of view in the horizontal direction of the display unit 112, and the number of pixels W in the horizontal direction of the display unit 112. The distance d is expressed as in Equation (4) below according to a geometric relation between the direction (the outgoing direction $\theta_1$) of the wireless terminal 2 and $\theta_{max}$ which is the half of the maximum angle of view.

$$d = \frac{\sin\theta_1}{\sin\theta_{max}} * \frac{W}{2} \qquad (4)$$

When correction is performed based on signal intensity, the distance between the center of the display unit 112 and the position at which the additional information is to be displayed is represented as X pixels. Here, X is expressed as in Equation (5).

$$X = \frac{\sin\theta_2}{\sin\theta_{max}} * \frac{W}{2} \qquad (5)$$

Further, a relation between $\theta_1$ and $\theta_2$ is expressed as in Equation (6).

$$\theta_2 = \tan^{-1}\left(\frac{L - R\sin\theta_1}{R\cos\theta_1}\right) \qquad (6)$$

Here, $\theta_{max}$ is indicates an angle of the half of the maximum angle of view. W is an integer when an LCD panel of the display unit is determined and $\theta_{max}$ which is the half of the maximum angle of view is also an integer when an image capturing system is determined. Accordingly, the distance X, that is, the estimated position, can be determined by substituting Equation (6) into Equation (5) to eliminate $\theta_2$ and substituting the relative angle $\theta_1$ and R.

The estimated position calculation unit 110 calculates the distance X by substituting the relative angle $\theta_1$ input from the relative angle extraction unit 109, the calculated distance R, $\theta_{max}$ which is the angle of the half of the angle of view of the image capturing unit 101, and the distance L between the center of the image capturing unit 101 and the center of the array antenna 102 into Equation (5) and Equation (6). The estimated position calculation unit 110 outputs display position information indicating the calculated distance X which is the display position of the additional information of the wireless terminal 2 to the display control unit 111.

(Display of Captured Video and Additional Information)

The display control unit 111 displays a video including each wireless terminal 2 imaged by the image capturing unit 101 on the display unit 112. The display control unit 111 displays the identification information itself input from the estimated position calculation unit 110 or the additional information figured or abstracted so that the operator can easily comprehend the identification information on the display unit 112 by superimposing the identification information on the estimated position calculated by the estimated position calculation unit 110.

Thus, according to the first preferred embodiment, the wireless terminal 2 transmits the response packet in response to the searching packet transmitted by the array antenna 102 to the imaging device 1. The array antenna 102 receives the response packet while changing the outgoing angle of the searching packet so that all of the regions of the viewing angle of the image capturing unit 101 are covered. The signal intensity detection unit 104 detects the signal intensity of the response packet. The relative angle calculation unit 109 calculates the relative angle of the wireless terminal 2 based on the identification information, the signal intensity, and the outgoing angle. The estimated position calculation unit 110 calculates the estimated position based on the relative angle of the wireless terminal 2, the signal intensity of the response packet received from the wireless terminal 2, the angle of view of the display unit 112, and the distance L between the center of the image capturing unit 101 and the center of the array antenna 102. The display control unit 111 causes the display unit 112 to display the additional information together with the image captured by the image capturing unit 101 at the estimated position calculated by the estimated position calculation unit 110.

Thus, according to the first preferred embodiment, even when the wireless terminal 2 is located in the vicinity of the imaging device 1, the additional information such as an icon can be displayed in the vicinity of the display position of the wireless terminal 2 on the image. Thus, it is easy to comprehend the attributes or the details of the wireless terminal 2.

The case in which the viewing angle of the image capturing system is constant has been described. However, even when the viewing angle of the image capturing system is changed as in zoom, a viewing angle can be converted from a set value of the zoom and the estimated position can be determined as described above. For example, the viewing angle may be obtained according to a set magnification of the zoom by recording a relation between the magnification of the zoom and the viewing angle in advance in the recording unit 108 and referring to the relation. In this case, as a matter of course, a change range of the outgoing angle of the array antenna 102 should cover a viewing angle after the change in the zoom.

A range of an angle at which the array antenna 102 searches for the wireless terminal 2 while changing the outgoing direction should necessarily be greater than or equal to the viewing angle of the image capturing unit 101. When the range of the angle at which the array antenna 102 searches for the wireless terminal 2 is less than the viewing angle of the image capturing unit 101, a dead region which is a region in which the additional information is not displayable may occur.

The video including the outer appearance of each wireless terminal 2 imaged by the image capturing unit 101 is assumed to be displayed using all of the W pixels of the width of the display unit 112. When a menu or the like other than the video is displayed at an end of the display unit 112, a result obtained by measuring the number of pixels in the display portion may be set to W.

The calculation of the estimated position is performed assuming that a center direction of scanning of the array antenna 102 is the same as a center direction of the image capturing of the image capturing unit 101. However, when there is a difference between these directions due to a disposition circumstance or the like, the difference may be corrected.

In the above-described constitution, the antenna control unit 106, the recording control unit 107, and the display control unit 111 are configured as different blocks, but may be configured to be integrated into, for example, a single control unit.

In the first preferred embodiment, the example in which the display unit 112 is disposed on the rear side of the image capturing unit 101 has been described, but the present invention is not limited thereto. The display unit 112 may be disposed at any position, as long as the display unit 112 is disposed so that a hand or a body part itself of an operator does not interrupt the fields of view of the image capturing unit 101 and the array antenna 102 when performing an operation. Further, the display unit 112 may be movable by a hinge or the like.

A frequency of updating of the measurement table is preferably a frequency at which the updating can be followed with respect to a change speed of the field of view of the imaging device or a movement speed of the wireless terminal within the angle of view.

When the video including the outer appearance of each wireless terminal imaged by the image capturing unit 101 is displayed, a moving image may be displayed at 25 frames/second to 60 frames/second or more, as in a general moving image camera, or an image may be displayed when a release is pressed, as in a still camera. As a matter of course, the displaying of a moving image is not preferable since the power consumption is larger and thus a battery of the image capturing terminal is increased accordingly. Accordingly, in practice, a trade-off between the display change frequency and the power consumption is determined for the decision. When a high-speed data transmission wireless system using millimeter waves or the like is used, a high-speed scan can be performed. Therefore, display of the additional information can be followed even when the imaging device is moved freely with the hands of an operator.

Second Preferred Embodiment

Hereinafter, a second preferred embodiment of the present invention will be described in detail with reference to FIG. 8. In the above-described first preferred embodiment, the case in which the estimated position calculation unit 110*a* calculates the estimated position based on the relative angle input from the relative angle extraction unit 109, the identification information read from the storage unit 108*a*, and the signal intensity has been described. In the second preferred embodiment, an example (calculation example 1 of an estimated position) in which a relation among a relative angle, a signal intensity, and a distance X is calculated in advance using Equation (1) to Equation (3), Equation (5), and Equation (6), the relation is stored as a table (distance X table) in a non-volatile memory such as a storage unit 108*a*, and an estimated position calculation unit 110*a* calculates the distance X corresponding to an input relative angle and an input signal intensity with reference to the distance X table will be described. In the second preferred embodiment, an example (calculation example 2 of the estimated position) in which a relation between the signal intensity and the distance R is calculated in advance using Equation (1) to Equation (3), the relation is stored as a table (distance R table) in the non-volatile memory such as the storage unit 108*a*, and the estimated position calculation unit 110*a* obtains the distance R corresponding to an input signal intensity with reference to the distance R table and obtains the distance X by substituting the distance R, the relative angle, the maximum angle of view, and the number of pixels in the horizontal direction of the display unit 112 into Equation (5) and Equation (6) will be described.

Figure 8:
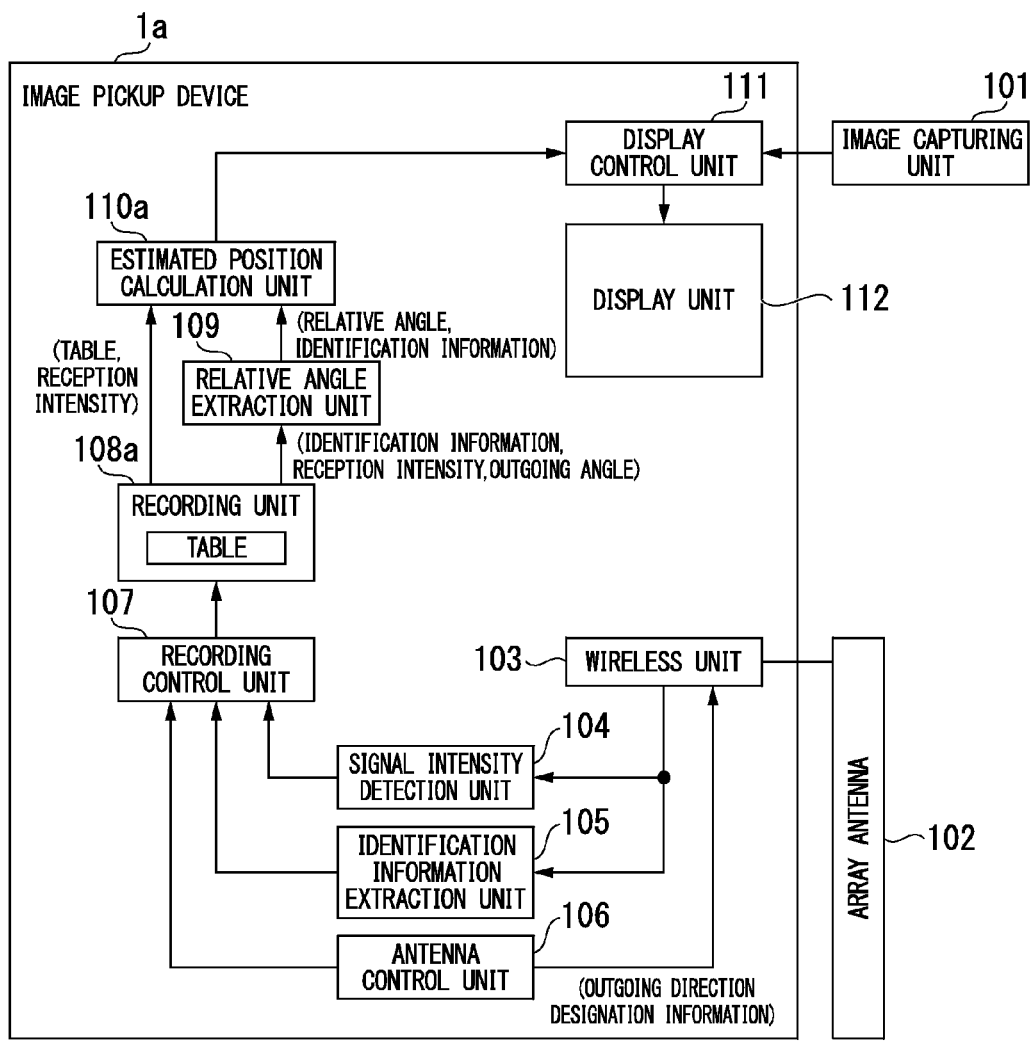
FIG. 8 is a block diagram illustrating the constitution of an imaging device in accordance with a second preferred embodiment of the present invention.

FIG. 8 is a block diagram illustrating the constitution of an imaging device 1a in accordance with the second preferred embodiment. When the imaging device 1a (FIG. 8) in accordance with the second preferred embodiment is compared with the imaging device 1 (FIG. 3) in accordance with the first preferred embodiment, the recording unit 108a and the estimated position calculation unit 110a are different. However, the functions of the different constituent elements are the same as the functions of the first preferred embodiment. The description of the same functions as those of the first preferred embodiment will be omitted.

The recording unit 108a stores a measurement table having data sets in which signal intensity information, identification information, and outgoing angle information are associated with each other. The recording unit 108a stores the distance X table (calculation example 1 of the estimated position), which is a table in which predetermined relative angles and signal intensities are associated with the distance X, and the distance R table (calculation example 2 of the estimated position), which is a table in which the signal intensities are associated with the distance R, in addition to the measurement table in a non-volatile memory or a non-volatile recording medium such as a hard disk. The signal intensity information, the identification information, and the outgoing angle information recorded in the recording unit 108a are read from a relative angle extraction unit 109. The distance X table and the distance R table recorded in the recording unit 108a are referred to by the estimated position calculation unit 110a. The signal intensity information recorded in the recording unit 108a is read from the estimated position calculation unit 110a. The recording unit 108a outputs the searching end information input from the recording control unit 107 to the relative angle extraction unit 109. The formats of the distance X table and the distance R table recorded in the recording unit 108a will be described below in detail with reference to FIGS. 9 and 10.

The relative angle information and the identification information are input from the relative angle extraction unit 109 to the estimated position calculation unit 110a. The signal intensity information is input from the recording unit 108a to the estimated position calculation unit 110a. Based on the relative angle information and the signal intensity information, the estimated position calculation unit 110a calculates the distance X regarding the display position of the additional information of the wireless terminal 2 displayed on the display unit 112. The estimated position calculation unit 110a outputs display position information indicating the calculated display position of the additional information of the wireless terminal 2 to the display control unit 111.

FIG. 9 is a schematic diagram illustrating an example of the distance X table recorded by the recording unit 108a. As illustrated in the drawing, the distance X table has columns of items of the relative angles $\theta_1$, the signal intensities $P_R$, and the distances X. The distance X table is data with a 2-dimensional table format having rows and columns in which the signal intensity and the distance X are stored for each relative angle. The row denoted by reference numeral 9a indicates that the relative angle is 0°, the signal intensity is −90 dB, and the distance X is 512 pixels. The row denoted by reference numeral 9b indicates that the relative angle is 0°, the signal intensity is −80 dB, and the distance X is 450 pixels. The row denoted by reference numeral 9c indicates that the relative angle is 15°, the signal intensity is −90 dB, and the distance X is 500 pixels. The row denoted by reference numeral 9d indicates that the relative angle is 15°, the signal intensity is −80 dB, and the distance X is 435 pixels.

FIG. 10 is a schematic diagram illustrating an example of the distance R table recorded by the recording unit 108a. As illustrated in the drawing, the distance R table has columns of items of the signal intensities $P_R$ and the distances R. The distance R table is data with a 2-dimensional table format having rows and columns in which the distance X is stored for each signal intensity. The row denoted by reference numeral 10a indicates that the signal intensity is −90 dB and the distance R is 300 mm. The row denoted by reference numeral 10b indicates that the signal intensity is −80 dB and the distance R is 450 mm.

(Calculation Example 1 of Estimated Position)

The identification information and the relative angle information are input from the relative angle extraction unit 109 to the estimated position calculation unit 110a. The estimated position calculation unit 110a extracts the distance X indicating the estimated position from the distance X table recorded by the recording unit 108a based on the relative angle information and the signal intensity information read from the measurement table stored in the recording unit 108a and corresponding to the identification information and the relative angle information. The estimated position calculation unit 110a outputs the distance X and the identification information to the display control unit 111.

(Calculation Example 2 of Estimated Position)

The identification information and the relative angle information input from the relative angle extraction unit 109 are input to the estimated position calculation unit 110a. The estimated position calculation unit 110a reads the signal intensity corresponding to the identification information and the relative angle information from the measurement table. The estimated position calculation unit 110a extracts the distance R corresponding to the signal intensity from the distance R table. The estimated position calculation unit 110a calculates the distance X by substituting the extracted distance R and the relative angle input from the relative angle extraction unit 109 into Equation (5) and Equation (6). The estimated position calculation unit 110a outputs the distance X and the identification information to the display control unit 111.

Thus, according to the second preferred embodiment, the recording unit 108a has the conversion table in which the relative angle and the signal intensity of the response data corresponds to the estimated position and the estimated position calculation unit 110a estimates the estimated position using the conversion tables. Further, the recording unit 108a has the conversion table in which the signal intensity corresponds to the distance R, and the estimated position calculation unit 110a estimates the estimated position by performing the calculation using the relative angle and the distance R extracted from the conversion table. Thus, calculation cost can decrease and a processing speed can increase.

In the second preferred embodiment, the example in which the calculation is performed using the distance X table and the distance R table has been described. However, a table (conversion table) having other parameters may be used. For example, a table in which the distance R, the relative angle, and the distance X correspond to each other may be used.

Third Preferred Embodiment

Hereinafter, a third preferred embodiment of the present invention will be described in detail with reference to the drawings. In the third preferred embodiment, a case in which an imaging device performs photographing assistance will be described. An imaging device 1b in accordance with the third preferred embodiment is, for example, a digital camera. The description will be made assuming a case in which runners running a race at a sports festival are photographed using the digital camera.

Figure 11:
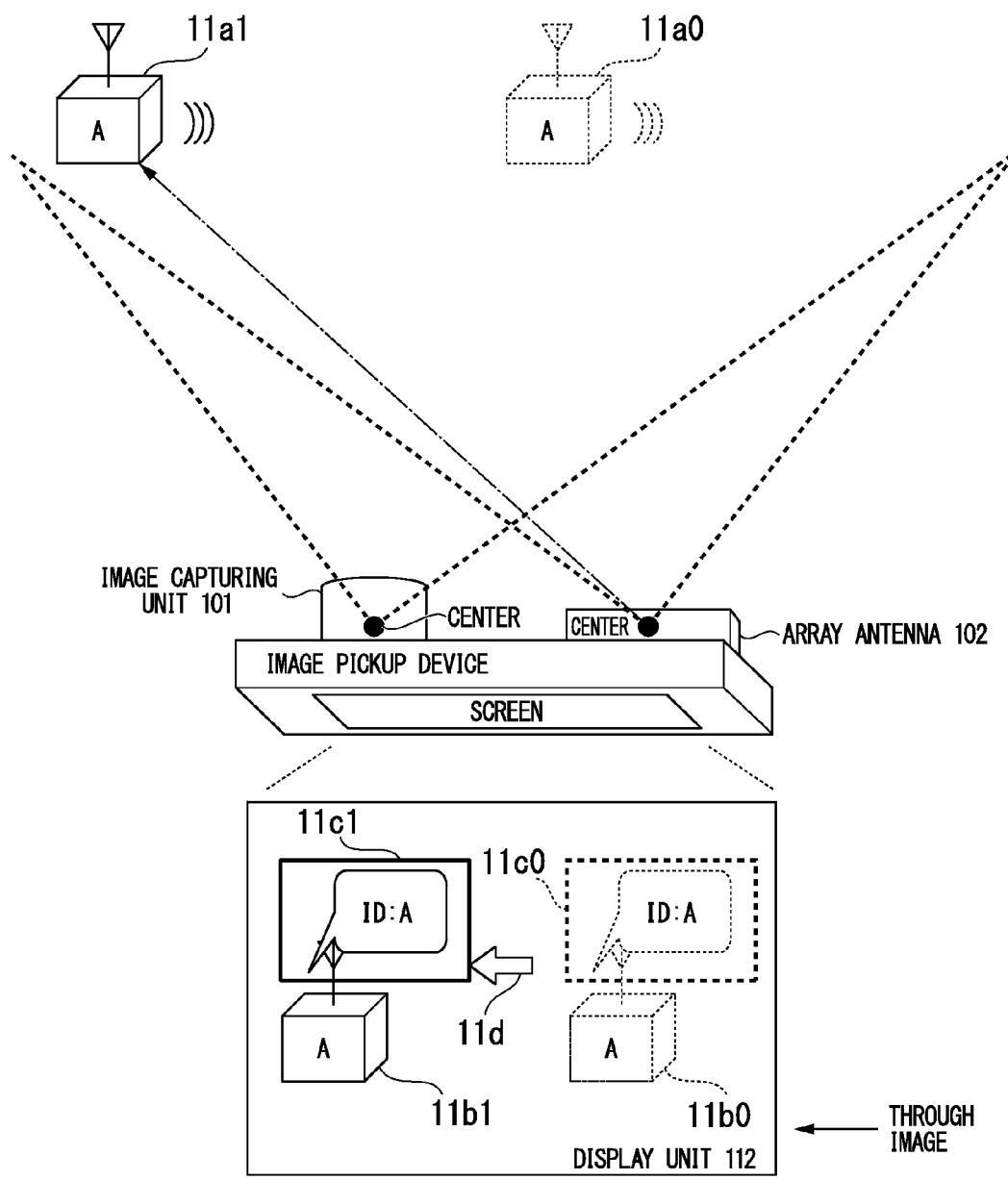
FIG. 11 is a diagram illustrating photographing assistance of an imaging device in accordance with a third preferred embodiment of the present invention.

FIG. 11 is a diagram illustrating the photographing assistance. A reference numeral 11a indicates the current position of a subject on which a wireless terminal 2 is mounted in the real space. A reference numeral 11a0 indicates a past position of the subject on which the wireless terminal 2 is mounted in the real space. An image 11b1 indicates an image obtained by image capturing a runner who is a subject of the image capturing unit 101 and displayed on the display unit 112. An image 11b0 indicates an image obtained by image capturing the runner who is the subject in the past by the image capturing unit 101 and displayed on the display unit 112. An icon 11c1 indicates additional information of the wireless terminal 2. An icon 11c1 indicates additional information of the wireless terminal 2 displayed in the past. An arrow icon 11d is an icon of an arrow indicating a movement direction of the wireless terminal 2 determined based on information regarding the past position of the wireless terminal 2 and the current position of the wireless terminal 2. In the photographing assistance, the arrow icon 11d is displayed to assist an operator to photograph a moving subject.

Figure 12:
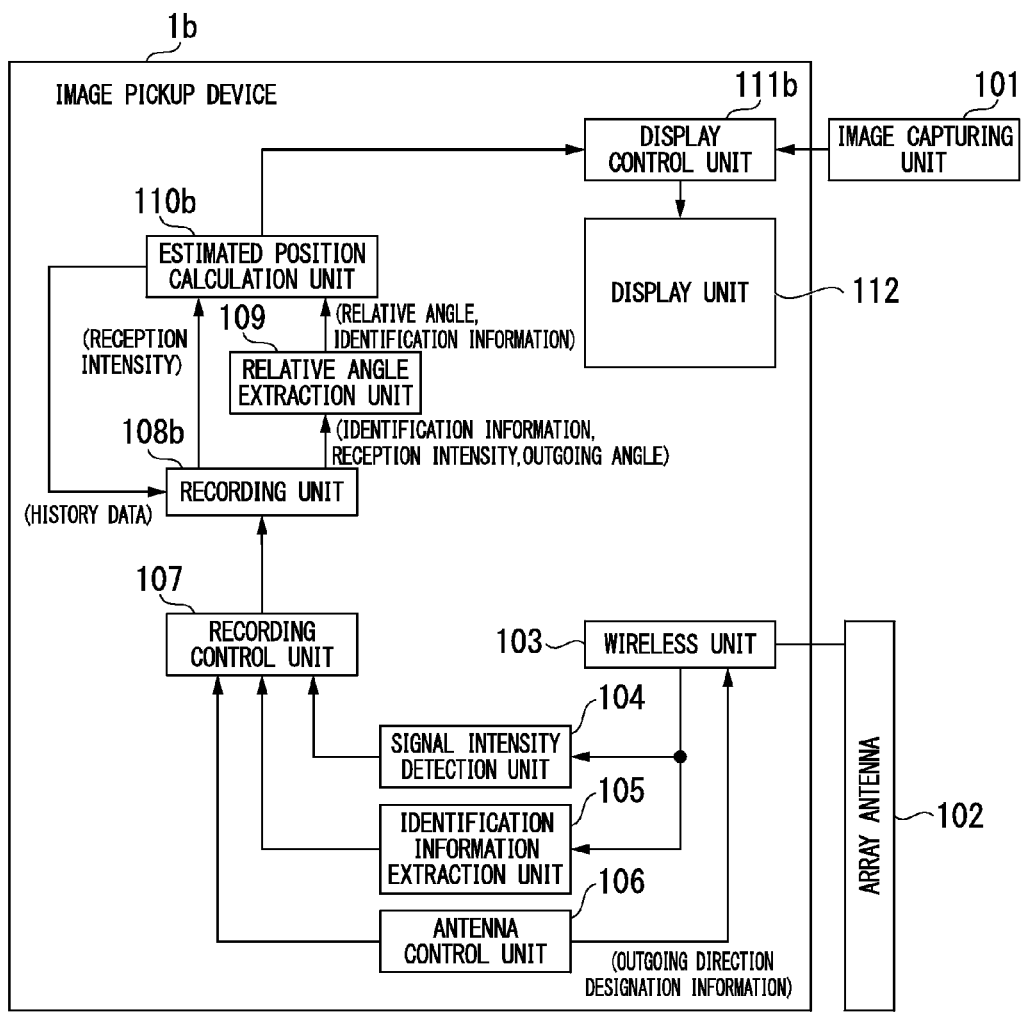
FIG. 12 is a block diagram illustrating the constitution of the imaging device in accordance with the third preferred embodiment.

FIG. 12 is a block diagram illustrating the constitution of the imaging device 1b in accordance with the third preferred embodiment. When the imaging device 1b (FIG. 12) in accordance with the third preferred embodiment is compared with the imaging device 1 (FIG. 3) in accordance with the first preferred embodiment, a recording unit 108b, an estimated position calculation unit 110b, and a display control unit 111b are different. However, the functions of the different constituent elements are the same as the functions of the first preferred embodiment. The description of the same functions as the functions of the first preferred embodiment will be omitted.

The recording unit 108b stores a measurement table having data sets in which signal intensity information, identification information, and outgoing angle information are associated with each other. The signal intensity information, the identification information, and the outgoing angle information recorded in the recording unit 108b are read from a relative angle extraction unit 109. The signal intensity information recorded in the recording unit 108b is read from the estimated position calculation unit 110b. The recording unit 108b outputs the searching end information input from the recording control unit 107 to the relative angle extraction unit 109. Display position information indicating the display position of additional information of the wireless terminal 2 calculated by the estimated position calculation unit 110b and identification information corresponding to the display position information are written on the recording unit 108b. The display position information recorded in the recording unit 108b and the identification information corresponding to the display position information are read from the estimated position calculation unit 110b.

The estimated position calculation unit 110b calculates a display position of the additional information of the wireless terminal 2 displayed on the display unit 112 based on the relative angle input from the relative angle extraction unit 109, the angle of view of the image capturing unit 101, the number of pixels of the display unit 112, and the signal intensity information. The estimated position calculation unit 110b reads the identification information and (past) display position information from the recording unit 108b. The estimated position calculation unit 110b generates movement direction information indicating the movement direction of the wireless terminal 2 based on the calculated display position of the additional information of the wireless terminal and the past display position indicated by the past display position information read from the recording unit 108b. The estimated position calculation unit 110b outputs the generated movement direction information to the display control unit 111b.

Video information obtained by image capturing the outer appearance of each wireless terminal 2 by the image capturing unit 101 is input to the display control unit 111b. The display control unit 111b generates, in a video indicated by the video information, display information in which the additional information corresponding to the identification information input from the estimated position calculation unit 110b and an icon representing the direction indicated by the movement direction information are superimposed on the display position indicated by the display position information input from the estimated position calculation unit 110b. The display control unit 111b outputs the generated display information to the display unit 112.

(Generation of Movement Direction Information)

The estimated position calculation unit 110b calculates the display position of the additional information of the wireless terminal 2 displayed on the display unit 112. Specifically, the estimated position calculation unit 110b reads the identification information and the (past) display position information from the recording unit 108b. When $(d_x, d_y)$ is assumed to be the current display position and $(d_{x0}, d_{y0})$ is assumed to be the past display position indicated by the past display position information, the estimated position calculation unit 110b calculates a difference (movement direction) between the current display position and the past display position, the difference being expressed by $(d_x - d_{x0}, d_y - d_{y0})$. The estimated position calculation unit 110b outputs the movement direction information indicating the movement direction and the identification information to the display control unit 111b. The estimated position calculation unit 110b writes the current display position and the identification information on the recording unit 108b.

(Display of Movement Direction Information)

The display control unit 111b generates display information in which the video indicated by the video information, the additional information corresponding to the identification information input from the estimated position calculation unit 101b, and the icon presenting the direction indicated by the movement direction information are superimposed on the display surface of the display unit 112. The display unit 112 displays the video indicated by the display information on the display surface.

Thus, according to the third preferred embodiment, the estimated position calculation unit 110b calculates the movement direction of the wireless terminal 2 based on the current position of the wireless terminal 2 and the past position of the wireless terminal 2 and displays the information indicating the movement direction on the display unit 112. Accordingly, the operator can easily photograph a moving subject while following the moving subject.

Fourth Preferred Embodiment

Hereinafter, a fourth preferred embodiment of the present invention will be described in detail with reference to the drawings. In the fourth preferred embodiment, a case in which connection between a plurality of wireless terminals is switched in a wireless system including an imaging device 1c and the plurality of wireless terminals 2 will be described.

Figure 13:
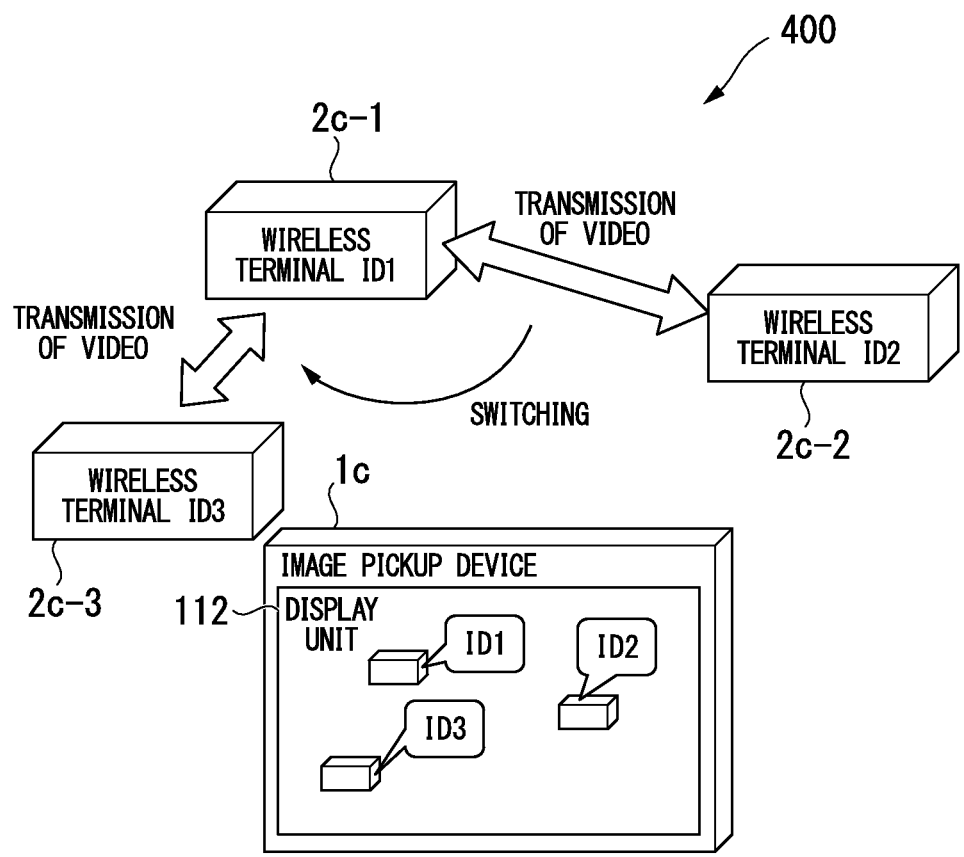
FIG. 13 is a schematic diagram illustrating a wireless system in accordance with a fourth preferred embodiment of the present invention.

FIG. 13 is a schematic diagram illustrating the wireless system in accordance with the fourth preferred embodiment.

In the illustrated example, a wireless system 400 includes the imaging device 1c and three wireless terminals 2c-1, 2c-2, and 2c-3. Here, an example in which, when the wireless terminal 2c-1 (for example, a liquid crystal television) and the wireless terminal 2c-2 (for example, DVD player 1) are wirelessly connected and video information is transmitted from the wireless terminal 2c-2 to the wireless terminal 2c-1, the connection is changed to connection between the wireless terminal 2c-1 (for example, a liquid crystal television) and the wireless terminal 2c-3 (for example, DVD player 2) is illustrated. At this time, not only ID information of the wireless terminals 2c-1 to 2c-3 is displayed, but the actual positions of the wireless terminals 2c-1 to 2c-3 are also displayed simultaneously on the display surface.

Figure 14:
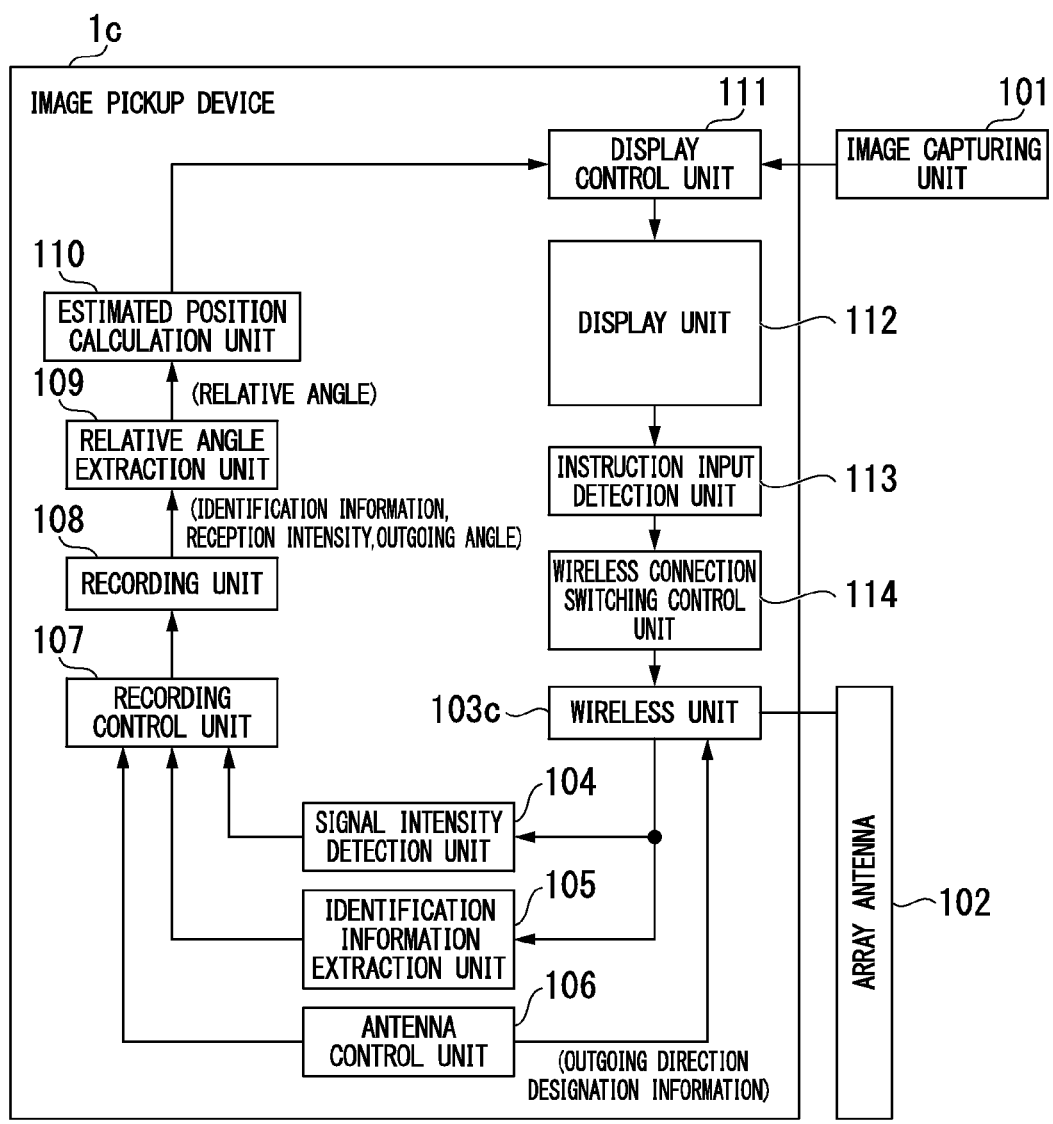
FIG. 14 is a block diagram illustrating the constitution of an imaging device in accordance with the fourth preferred embodiment.

FIG. 14 is a block diagram illustrating the constitution of the imaging device 1c. When the imaging device 1c (FIG. 14) in accordance with the fourth preferred embodiment is compared with the imaging device 1 (FIG. 3) in accordance with the first preferred embodiment, an instruction input detection unit 113 and a wireless connection switching control unit 114 are newly added and a process of a wireless unit 103c is different. However, the functions of the different constituent elements are the same as the functions of the first preferred embodiment. The wireless terminal 2 in accordance with the fourth preferred embodiment is the same as the wireless terminal 2 in accordance with the first preferred embodiment. The description of the same functions as the functions of the first preferred embodiment will be omitted.

The instruction input detection unit 113 includes a touch panel installed in the display unit 112 or a switch such as a jogging dial switch used to select a cursor or the like. The instruction input detection unit 113 detects that an operator selects a video of the wireless terminal displayed on the display unit 112 or identification information displayed in the vicinity (also called a selection region) of the video. When the operator desires to newly establish a connection from the wireless terminal 2c-2 to the wireless terminal 2c-1, for example, the operator first selects the selection region of the wireless terminal 2c-2, and continuously selects the selection region of the wireless terminal 2c-1. Through this operation, the instruction input detection unit 113 detects that the operator selects the connection from the wireless terminal 2c-2 to the wireless terminal 2c-1. In the case of this example, the instruction input detection unit 113 outputs selection information indicating the connection from the wireless terminal 2c-2 to the wireless terminal 2c-1 to the wireless connection switching control unit 114. The wireless connection switching control unit 114 generates a connection control packet (control data) indicating that the wireless connection between the wireless terminals is disconnected and the new wireless connection is established based on the selection information input from the instruction input detection unit 113, and outputs the generated connection control packet to the wireless unit 103c.

The wireless unit 103c converts the connection control packet input from the wireless connection switching control unit 114 and used to give an instruction to switch the connection between the wireless terminals into an RF signal. The wireless unit 103c generates a searching packet (searching data) used to search for the wireless terminal and converts the generated searching packet into an RF signal.

Upon receiving the searching packet, the wireless terminals 2c-1, 2c-2, and 2c-3 illustrated in FIG. 13 converts and transmits a response packet (response data) indicating that data communication is possible. The imaging device 1c receives the modulated response packet through the array antenna 102 and demodulates the response packet through the wireless unit 103c.

Figure 15:
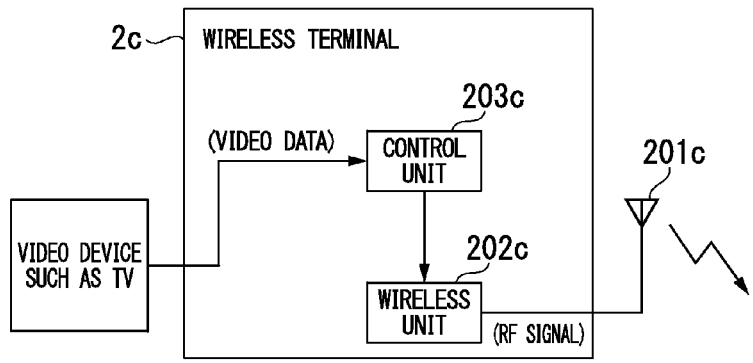
FIG. 15 is a block diagram illustrating the constitution of a wireless terminal in accordance with the fourth preferred embodiment.

FIG. 15 is a block diagram illustrating the constitution of the wireless terminal 2c in accordance with the fourth preferred embodiment. When the wireless terminal 2c (FIG. 15) in accordance with the fourth preferred embodiment is compared with the wireless terminal 2 (FIG. 4) in accordance with the first preferred embodiment, an antenna 201c, a wireless unit 202c, and a control unit 203c are different. However, the functions of the different constituent elements are the same as those of the first preferred embodiment. The description of the same functions as those of the first preferred embodiment will be omitted. The antenna 201c is used for both of communication with the imaging device 1c and communication with another wireless terminal 2c that transmits larger data than the imaging device. The antenna 201c transmits an RF signal input from the wireless unit 202c as radio waves directed to the imaging device 1c and another wireless terminal 2c. The antenna 201c receives radio waves transmitted from the imaging device 1c and another wireless terminal 2c. The antenna 201c outputs the RF signal corresponding to the received radio waves to the wireless unit 202c. When the RF signal is input from the antenna 201c, the wireless unit 202c converts the input RF signal into a baseband signal and outputs the converted baseband signal to the control unit 203c. The wireless unit 202c converts the baseband signal input from the control unit 203c into an RF signal and outputs the converted RF signal to the antenna 201c. When the searching packet is input from the wireless unit 202c, the control unit 203c outputs a response packet to which ID information of the wireless terminal 2c is added to the wireless unit 202c. A connection control packet used to give an instruction to switch connection between the wireless terminals is input from the wireless unit 202c to the control unit 203c. The control unit 203c establishes connection with another wireless terminal indicated by the connection control packet by outputting a connection request packet used to make a connection request or a disconnection request packet used to make a disconnection request to the wireless unit 202c in response to the connection instruction indicated by the connection control packet. After the establishment, the control unit 203c transmits video data between a video device such as a TV or a DVD player connected to the control unit 203c and the wireless unit 202c.

(Switching of Connection of Wireless Terminals)

The wireless terminal 2c has a first data communication function of replying to the searching packet from the imaging device 1c and a second data communication function of communicating data including a video or the like considerably larger than an amount of data of the data communication with the imaging device 1c with each wireless terminal 2c. A combination, the directions, or the like of the wireless terminals 2c performing the second data communication are preferably changed freely. For example, a case in which the wireless terminal 2c-1 illustrated in FIG. 13 is connected to a liquid crystal display, the wireless terminal 2c-2 is connected to a DVD player A, and the wireless terminal 2c-3 is connected to another DVD player B will be considered. When switching wireless connection partners thereamong by the second data communication function, the imaging device 1c is positioned as a control unit mounted on a multi-function remote controller that switches the connection between the wireless terminals 2c.

Here, for example, a case in which the connection is switched so that a moving image is transmitted between the wireless terminal 2c-1 with ID1 and the wireless terminal 2c-2 with ID2 when the moving image is transmitted between the wireless terminal 2c-1 with ID1 and the wireless terminal 2c-3 with ID3 will be described.

The display unit 112 displays not only the video of each wireless terminal imaged by the image capturing unit 101 but also the additional information in the vicinity of the position of the wireless terminal on the video. The instruction input detection unit 113 detects the instruction for the operator to select the additional information of the wireless terminal 2c-2 or the vicinity of the addition information and generates information (selection information) indicating the selected additional information. The instruction input detection unit 113 outputs the selection information to the wireless connection switching control unit 114. When the selection information is input, the wireless connection switching control unit 114 determines that the wireless terminal 2c-2 corresponding to the additional information is selected. The wireless connection switching control unit 114 disconnects the wireless terminal 2c-1 from the wireless terminal 2c-3 and transmits a connection control packet used to give an instruction to establish connection with the wireless terminal 2c-2 to the wireless terminal 2c-1 via the wireless unit 103c and the array antenna 102.

The antenna 201c of the wireless terminal 2c-1 receives the connection control packet. The connection control packet is input to the control unit 203c of the wireless terminal 2c-1 via the wireless unit 202c. The control unit 203c of the wireless terminal 2c-1 outputs the disconnection request packet directed to the wireless terminal 2c-3 to the antenna 201c via the wireless unit 202c. The antenna 201c of the wireless terminal 2c-1 transmits the disconnection request packet directed to the wireless terminal 2c-3. The antenna 201c of the wireless terminal 2c-3 receives the disconnection request packet from the wireless terminal 2c-1. The disconnection request packet is input to the control unit 203c of the wireless terminal 2c-3 via the wireless unit 202c. The control unit 203c of the wireless terminal 2c-3 stops outputting moving image data input from a video device or the like to the wireless unit 202c.

On the other hand, the control unit 203c of the wireless terminal 2c-1 transmits the connection request packet directed to the wireless terminal 2c-2 via the wireless unit 202c and the antenna 201c. The antenna 201c of the wireless terminal 2c-2 receives the connection request packet. The connection request packet is input to the control unit 203c of the wireless terminal 2c-2 via the wireless unit 202c. The control unit 203c of the wireless terminal 2c-2 outputs the moving image data input from the video device or the like to the wireless unit 202c to start transmitting the moving image data via the antenna 201c.

In the present wireless system 100, through the series of processes, the instruction to switch the wireless connection between the wireless terminal 2c is input to the imaging device 1c, and a combination and a direction of the transmission and reception of the second data communication between the wireless terminals 2c are switched in response to the instruction. According to the fourth preferred embodiment, the wireless terminal 2c performs the communication with the imaging device 1 and another wireless terminal 2c using the same antenna 201c. Thus, when the communication between the wireless terminals is switched through wireless communication from an external control device (imaging device), it is not necessary for the wireless terminal to include a wireless unit dedicated to switch communication. Thus, the cost can be reduced and miniaturization can be realized.

Modification Example

In the above-described fourth preferred embodiment, the case in which the wireless terminal 2c performs the communication with the imaging device 1c and another wireless terminal 2c using the common antenna 201c has been described. In this modification example, a case in which a wireless terminal 2c' includes a counter imaging device antenna 201c'-1 communicating with the imaging device 1c, a counter wireless terminal antenna 201c'-2 communicating with another wireless terminal 2c', a counter imaging device wireless unit 202c'-1 which is a wireless unit corresponding to the counter imaging device antenna 201c'-1, and a counter wireless terminal wireless unit 202c'-2 which is a wireless unit corresponding to the counter wireless terminal antenna 201c'-2 will be described.

Figure 16:
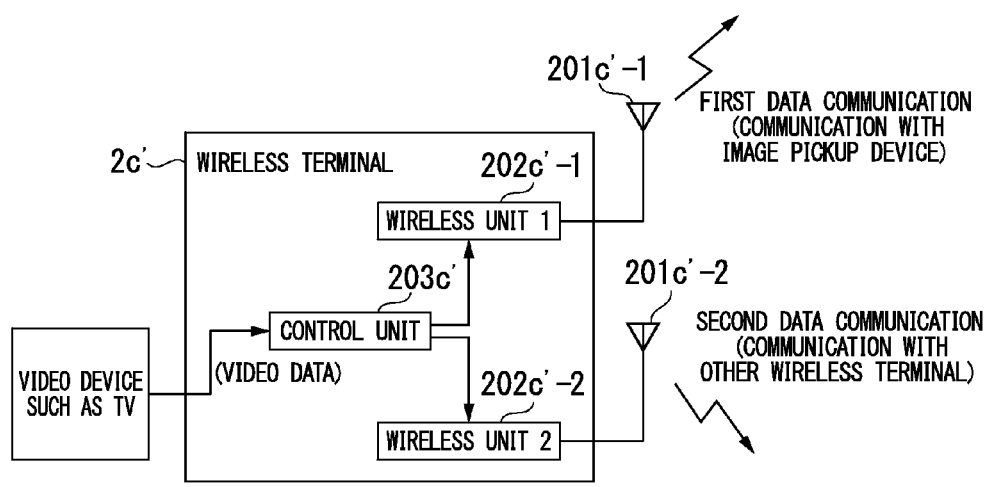
FIG. 16 is a block diagram illustrating the constitution of a wireless terminal in accordance with a modification example.
Figure 17:
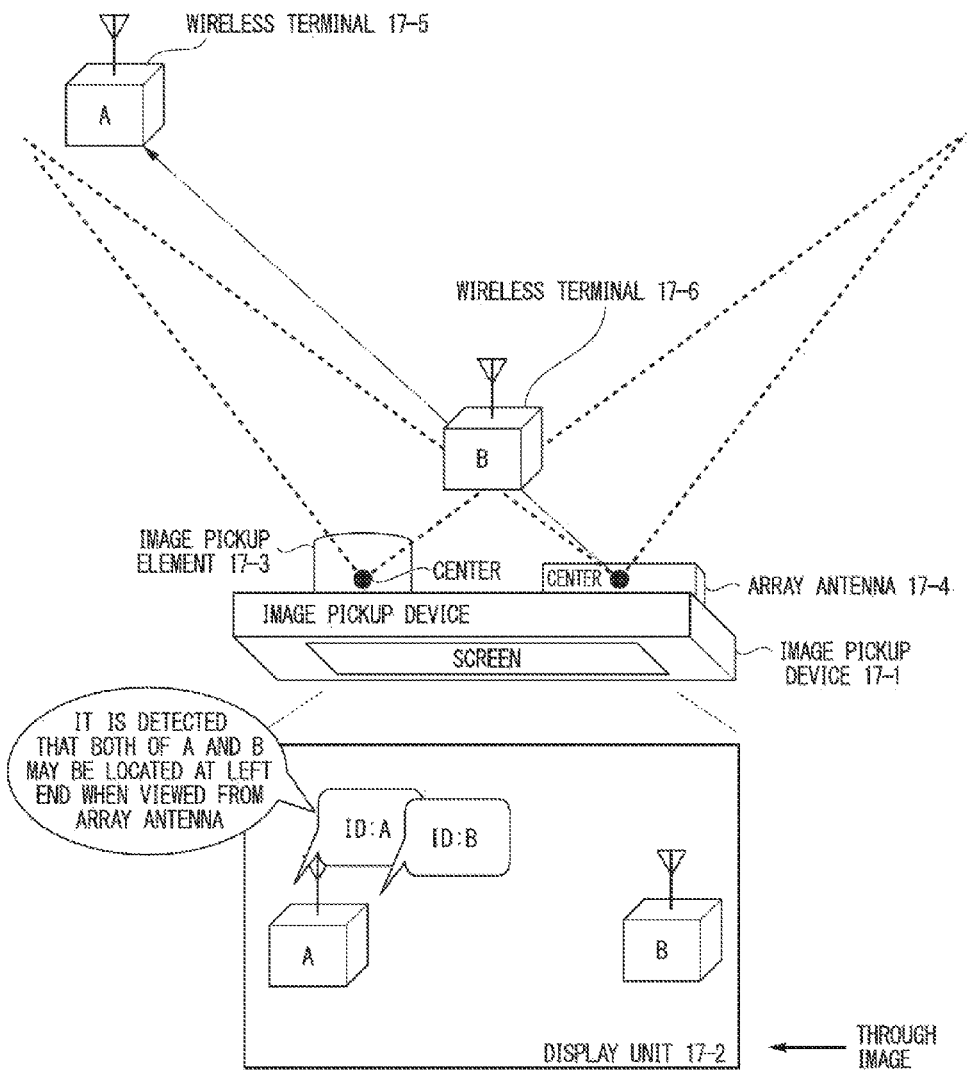
FIG. 17 is a diagram illustrating an example of the related art.

FIG. 16 is a block diagram illustrating the constitution of the wireless terminal 2c' in accordance with this modification example. In the illustrated example, the wireless terminal 2c' includes the counter imaging device antenna 201c'-1, the counter wireless terminal antenna 201c'-2, the counter imaging device wireless unit 202c'-1, the counter wireless terminal wireless unit 202c'-2, and a control unit 203c'. The counter imaging device antenna 201c'-1 transmits an RF signal input from the counter imaging device wireless unit 202c'-1 as radio waves directed to the imaging device 1c. The counter imaging device antenna 201c'-1 receives radio waves transmitted from the imaging device 1c'. The counter imaging device antenna 201c'-1 outputs an RF signal corresponding to the received radio waves to the counter imaging device wireless unit 202c'-2. The counter wireless terminal antenna 201c'-2 transmits the RF signal input from the counter wireless terminal wireless unit 202c'-2 as radio waves directed to another wireless terminal 2.

The counter wireless terminal antenna 201c'-2 receives radio waves transmitted from the other wireless terminal 2. The counter wireless terminal antenna 201c'-2 outputs an RF signal corresponding to the received radio waves to the counter wireless terminal wireless unit 202c'-2.

When the RF signal is input from the counter imaging device antenna 201c'-1, the counter imaging device wireless unit 202c'-2 converts the input RF signal into a baseband signal and outputs the converted baseband signal to the control unit 203c'. The counter imaging device wireless unit 202c'-2 converts the baseband signal input from the control unit 203c' into an RF signal and outputs the converted RF signal to the counter imaging device antenna 201c'-1. When the RF signal is input from the counter wireless terminal antenna 201c'-2, the counter wireless terminal wireless unit 202c'-2 converts the input RF signal into a baseband signal and outputs the converted baseband signal to the control unit 203c'. The counter wireless terminal wireless unit 202c'-2 converts the baseband signal input from the control unit 203c' into an RF signal and outputs the converted RF signal to the counter wireless terminal antenna 201c'-2.

When a searching packet is input from the counter imaging device wireless unit 202c'-2 to the control unit 203c', a response packet to which ID information of the wireless terminal 2 is added is output to the counter wireless terminal wireless unit 202c'-2. A connection control packet used to give an instruction to switch the connection between the wireless terminals is input from the counter wireless terminal wireless unit 202c'-2 to the control unit 203c'. The control unit 203c' establishes connection with another wireless terminal indicated by the connection control packet by outputting a connection request packet used to make a connection request or a disconnection request packet used to make a disconnection request to the counter wireless terminal wireless unit 202c'-2 in response to the connection instruction indicated by the connection control packet. After the establishment, the control unit 203c' transmits video data between a video device such as a TV or a DVD player connected to the control unit 203c' and the counter wireless terminal wireless unit 202c'-2.

Here, for example, a case in which the connection is switched so that a moving image is transmitted between the wireless terminal 2c'-1 with ID1 and the wireless terminal 2c'-2 with ID2 when the moving image is transmitted between the wireless terminal 2c'-1 with ID1 and the wireless terminal 2c'-3 with ID3 will be described.

The display unit 112 displays not only the video of each wireless terminal imaged by the image capturing unit 101 but also the additional information in the vicinity of the position of the wireless terminal on the video. The instruction input detection unit 113 detects the instruction for the operator to select the additional information of the wireless terminal 2c'-2 or the vicinity of the additional information and generates information (selection information) indicating the selected additional information. The instruction input detection unit 113 outputs the selection information to the wireless connection switching control unit 114. When the selection information is input, the wireless connection switching control unit 114 determines that the wireless terminal 2c'-2 corresponding to the additional information is selected. The wireless connection switching control unit 114 disconnects the wireless terminal 2c'-1 from the wireless terminal 2c'-3 and transmits a connection control packet used to give an instruction to establish connection with the wireless terminal 2c'-2 to the wireless terminal 2c'-1 via the wireless unit 103 and the array antenna 102.

The counter imaging device antenna 201c'-1 of the wireless terminal 2c'-1 receives the connection control packet. The connection control packet is input to the control unit 203c' of the wireless terminal 2c'-1 via the counter imaging device wireless unit 202c'-1. The control unit 203c' of the wireless terminal 2c'-1 outputs the disconnection request packet directed to the wireless terminal 2c'-3 to the counter wireless terminal antenna 201c'-2 via the counter wireless terminal wireless unit 202c'-2. The counter wireless terminal antenna 201c'-2 of the wireless terminal 2c'-1 transmits the disconnection request packet directed to the wireless terminal 2c'-3. The counter wireless terminal antenna 201c'-2 of the wireless terminal 2c'-3 receives the disconnection request packet. The disconnection request packet is input to the control unit 203c' of the wireless terminal 2c'-3 via the counter wireless terminal wireless unit 202c'-2. The control unit 203c' of the wireless terminal 2c'-3 stops outputting moving image data input from a video device or the like to the counter wireless terminal wireless unit 202c'-2.

On the other hand, the control unit 203c' of the wireless terminal 2c'-1 transmits the connection request packet directed to the wireless terminal 2c'-2 via the counter wireless terminal wireless unit 202c'-2 and the counter wireless terminal antenna 201c'-2. The counter wireless terminal antenna 201c'-2 of the wireless terminal 2c'-2 receives the connection request packet. The connection request packet is input to the control unit 203c' of the wireless terminal 2c'-2 via the counter wireless terminal wireless unit 202c'-2. The control unit 203c' of the wireless terminal 2c'-2 outputs the moving image data input from the video device or the like to the counter wireless terminal wireless unit 202c'-2 to start transmitting the moving image data via the counter wireless terminal antenna 201c'-2.

In the present wireless system 400, through the series of processes, the instruction to switch the wireless connection between the wireless terminal 2c' is input to the imaging device 1c, and a combination and a direction of the transmission and reception of the second data communication between the wireless terminals 2c' are switched in response to the instruction.

Thus, according to this modification example, the wireless terminal 2c' includes the counter imaging device antenna 201c'-1 communicating with the imaging device 1c and the counter wireless terminal antenna 201c'-2 communicating with another wireless terminal 2c' to perform each communication. Accordingly, in this modification example, when communication with the imaging device 1c and communication with another wireless terminal 2c' are performed at different frequencies, the communications can be performed asynchronously at any time. Therefore, software processing of the control unit is simplified. Further, each of the counter imaging device wireless unit 202c'-1 and the counter wireless terminal wireless unit 202c'-2 can select an appropriate wireless scheme according to the amount of each communication.

In each of the above-described preferred embodiments, an antenna having a mechanism capable of changing directivity mechanically in the horizontal direction and in the elevation direction may be used instead of the array antenna 102.

When the array antenna is used, it is easy to miniaturize the antenna as the wireless frequency used in the wireless unit is higher. For example, when millimeter waves with a 60 GHz band or the like are used, the miniaturization can be realized by disposing the antenna on an IC chip.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

The present invention is applicable widely to an imaging device and a wireless system. Thus, when information such as an icon indicating a wireless terminal is displayed in the vicinity of an image of the wireless terminal on a display screen, accuracy of the display position of the information can be improved.

What is claimed is:

1. An imaging device comprising:
    an image capturing unit that captures an image;
    a display unit that displays the image;
    an antenna that is disposed at a position determined in advance with respect to the image capturing unit;
    an antenna control unit that controls directivity of the antenna by changing a maximum gain direction of the antenna;
    a wireless unit that transmits searching data to one or more wireless terminals through the antenna and receives response data corresponding to the searching data;
    a signal intensity detection unit that detects a reception intensity of the response data;
    an identification information extraction unit that specifies identification information of the wireless terminal which is a transmission source of the response data;
    a recording control unit that generates data sets in which the identification information, the reception intensity, and the maximum gain direction are associated with each other;
    a recording unit that records the data sets;
    a relative angle extraction unit that extracts the maximum gain direction of the data set having the reception intensity relatively greater than the other reception intensities among the data sets with the same identification information recorded in the recording unit, as a relative angle indicating a relative direction of the wireless terminal relative to the imaging device serving as a reference;

an estimated position calculation unit that calculates an estimated position of the wireless terminal on the display unit based on an angle of view of the display unit, the relative angle, a positional relation between the image capturing unit and the antenna, and the reception intensity; and a display control unit that performs control such that the display unit displays the image and that superimposes and displays terminal information used to specify the wireless terminal corresponding to the identification information on the estimated position.

2. The imaging device according to claim 1, wherein the estimated position calculation unit calculates a distance between the imaging device and the wireless terminal based on the reception intensity and calculates the estimated position based on the angle of view, the relative angle, the positional relation between the image capturing unit and the antenna, and the distance.

3. The imaging device according to claim 1,
wherein the recording unit includes a conversion table generated in advance, and
wherein the estimated position calculation unit performs part of the calculation of the estimated position using a value read from the conversion table.

4. The imaging device according to claim 1,
wherein the recording unit includes a conversion table in which the estimated position calculated in advance based on the angle of view, the relative angle, the positional relation between the image capturing unit and the antenna, and the reception intensity corresponds to the reception intensity and the relative angle, and
wherein the estimated position calculation unit calculates the estimated position based on the relative angle, the reception intensity, and the conversion table.

5. The imaging device according to claim 1, wherein the antenna is an array antenna including a plurality of antenna elements and the antenna control unit controls the directivity by changing phases of signals applied to the antenna elements.

6. The imaging device according to claim 1, further comprising:
an instruction input detection unit that detects an instruction of an operator to perform wireless connection between the plurality of wireless terminals by detecting an instruction of the operator to select the terminal information displayed on the display unit; and
a wireless connection conversion control unit that performs control of transmission of control data regarding the wireless connection to at least one of the wireless terminals based on the instruction of the operator detected by the instruction input detection unit,
wherein the wireless unit transmits the control data.

7. A wireless system comprising:
the imaging device according to claim 6; and
the plurality of wireless terminals that switch connection between the wireless terminals based on the control data received from the imaging device.

8. The wireless system according to claim 7, wherein the wireless terminal performs wireless connection with the other wireless terminals and wireless connection with the imaging device using the same antenna and the same wireless unit.

9. The imaging device according to claim 2, wherein the antenna is an array antenna including a plurality of antenna elements and the antenna control unit controls the directivity by changing phases of signals applied to the antenna elements.

10. The imaging device according to claim 3, wherein the antenna is an array antenna including a plurality of antenna elements and the antenna control unit controls the directivity by changing phases of signals applied to the antenna elements.

11. The imaging device according to claim 4, wherein the antenna is an array antenna including a plurality of antenna elements and the antenna control unit controls the directivity by changing phases of signals applied to the antenna elements.

* * * * *